(12) United States Patent
Banister

(10) Patent No.: US 7,236,538 B1
(45) Date of Patent: Jun. 26, 2007

(54) METHOD AND APPARATUS FOR IMPROVING TRANSMIT ANTENNA WEIGHT TRACKING USING CHANNEL CORRELATIONS IN A WIRELESS COMMUNICATION SYSTEM

(75) Inventor: Brian C. Banister, San Diego, CA (US)

(73) Assignee: VIA Telecom Co., Ltd., San Diego, CA (US)

( * ) Notice: Subject to any disclaimer, the term of this patent is extended or adjusted under 35 U.S.C. 154(b) by 658 days.

(21) Appl. No.: 10/080,728

(22) Filed: Feb. 22, 2002

Related U.S. Application Data

(63) Continuation-in-part of application No. 09/632,081, filed on Aug. 2, 2000, now Pat. No. 6,952,455.

(60) Provisional application No. 60/278,501, filed on Mar. 23, 2001.

(51) Int. Cl.
*H04B 7/02* (2006.01)

(52) U.S. Cl. ...................................... 375/267

(58) Field of Classification Search ................ 375/259, 375/260, 267, 295, 299, 296
See application file for complete search history.

(56) References Cited

U.S. PATENT DOCUMENTS

| 5,781,845 | A |   | 7/1998 | Dybdal et al. |
| 6,031,866 | A | * | 2/2000 | Oler et al. ................... 375/219 |
| 6,141,567 | A |   | 10/2000 | Youssefmir et al. |
| 6,144,711 | A |   | 11/2000 | Raleigh et al. |
| 6,434,366 | B1 | * | 8/2002 | Harrison et al. ............... 455/69 |
| 6,473,467 | B1 |   | 10/2002 | Wallace et al. |
| 6,804,312 | B1 | * | 10/2004 | Win et al. ................... 375/347 |
| 6,888,809 | B1 |   | 5/2005 | Foschini et al. |
| 6,952,455 | B1 |   | 10/2005 | Banister |

OTHER PUBLICATIONS

Rashid-Farrokhi, et al., "Transmit Beamforming and Power Control for Cellular Wirelesws Systems", IEEE Journal on Selected Areas in Communications, vol. 16, No. 8, Oct. 1998, pp. 1437-1450.
Pedersen, et al., "A Stochastic Model of the Temporal and Azimuthal Dispersion Seen at the Base Station in Outdoor Propagation Environments", IEEE Transactions on Vehicular Technology, vol. 49, No. 2, Mar. 2000, pp. 437-447.

(Continued)

*Primary Examiner*—Kevin Burd
(74) *Attorney, Agent, or Firm*—Jaquez & Associates; Martin J. Jaquez, Esq.; William C. Boling, Esq.

(57) ABSTRACT

A novel method and apparatus for improving transmit antenna weight tracking using channel vector element to element correlations in a wireless communication system is disclosed. The present channel autocorrelation tracking technique utilizes the observation that tracking can be improved when a channel gain vector contains correlated elements. In a first embodiment of the autocorrelation tracking technique, the present invention extracts a coarse gradient estimate by utilizing a perturbation vector autocorrelation matrix estimate and a perturbation autocorrelation matrix to update TxAA weight vectors accordingly. In a second embodiment of the channel autocorrelation tracking technique, the present invention extracts a coarse gradient estimate by utilizing eigendecompositions, perturbation vector autocorrelation matrix estimates, and perturbation autocorrelation matrices to update TxAA weight vectors accordingly. In a third embodiment of the channel autocorrelation tracking technique, the present invention reduces the phase change that can occur at receivers.

38 Claims, 9 Drawing Sheets

OTHER PUBLICATIONS

Banister, et al. "A Stochastic Gradient Algorithm for Transmit Antenna Weight Adaptation with Feedback", IEEE, 2001, pp. 314-317.

Harrison, et al. (Motorola) "Open and Closed Loop Transmit Diversity at High Data Rates on 2 and 4 Elements", document #C30-199990817-017, submitted to 3GPP2 Aug. 16-20, 1999, pp. 1-5.

Banister, et al. "Tracking Performance of a Stochastic Gradient Algorithm for Transmit Antenna Weight Adaptation with Feedback", IEEE, published May 2001, pp. 2965-2968.

Liang et al., "Transmit Antenna Array Techniques for Cellular CDMA Systems", IEEE, published Sep. 1998, pp. 1396-1400.

Liang, et al., "Forward Link Antenna Diversity Using Feedback for Indoor Communication Systems", IEEE, published May 1995, pp. 1753-1755.

Health, et al., "A Simple Scheme for Transmit Diversity Using Partial Channel Feedback", Information Systems Laboratory, IEEE, 1998, pp. 1073-1078.

Gerlach, et al., "Base Station Transmitting Antenna Arrays for Multipath Environments", Signal Processing, vol. 54, No. 1, published by Elsevier, Oct. 1996, pp. 59-73.

Gerlach, "Adaptive Transmitting Antenna Arrays with Feedback", IEEE 1994, pp. 150-152.

Gerlach, "Adaptive Transmitting Antenna Methods for Multipath Environments", IEEE, Globecom, 1994, pp. 425-429, vol. 1.

Derryberry, et al., "Transmit Adaptive Arrays without User Specific Pilot", 3GPP2-C30-19990817-030, Portland, Oregon, Aug. 16-20, 1999, pp. 1-4.

Harrison, "TX AA Parameter Recommendations", 3GPP2-C30-19990914-010, Tokyo, Japan, Sep. 14, 1999, pp. 1-3.

* cited by examiner

METHOD AND APPARATUS FOR IMPROVING TRANSMIT ANTENNA WEIGHT TRACKING USING CHANNEL CORRELATIONS IN A WIRELESS COMMUNICATION SYSTEM

CROSS-REFERENCE TO RELATED APPLICATIONS

This application claims benefit under 35 USC § 120 as a continuation-in-part of U.S. application Ser. No. 09/632,081, filed Aug. 2, 2000, entitled "Adaptive Antenna Method and Apparatus", now U.S. Pat. No. 6,952,455 issued Oct. 4, 2005, and also claims the benefit under 35 USC § 119 of U.S. Provisional Application No. 60/278,501, filed Mar. 23, 2001, entitled "Adaptive Antenna System and Method", and the contents of both of these documents are hereby incorporated in their entireties by reference.

BACKGROUND OF THE INVENTION

1. Field of the Invention

This invention relates to digital wireless communication systems, and more particularly to methods for improving transmit antenna weight tracking using channel correlations in a wireless communication system.

2. Description of Related Art

Digital wireless systems presently being deployed are commonly seen to be forward link (i.e., base station ("BS")-to-mobile station ("MS")) capacity limited. This is mostly due to asymmetric traffic scenarios: most data applications, such as web browsing, are envisioned to be sending relatively large quantities of data to the mobile user on the forward link, while the reverse link may contain only small control packets (i.e., a new IP address to download) so that the forward data rate is much greater than the reverse data rate.

Forward capacity can be increased with an array of antennae in a base station whose individual carrier amplitudes and phases can be adjusted based on feedback from a MS. In particular, a transmit adaptive antenna (TxAA) algorithm will typically transmit the same MS-specific waveform on multiple antennae, applying adaptive complex weights to the baseband signal applied to each antenna. To allow the MS to perform coherent demodulation, a dedicated pilot channel is typically transmitted in the same manner as the data.

While receive adaptive antenna (RxAA) algorithms at the BS are fairly straight forward, TxAA algorithms are not. The mere definition of an "optimal" TxAA algorithm is not unambiguous as the optimization of one mobile's forward link can degrade another's, leading to complex tradeoffs which are not part of the RxAA problem.

Most TxAA algorithms will require some a priori knowledge of the transmission channel from the BS to the MS. Given this knowledge and a defined "optimality" criterion, the BS can determine the TxAA weights. The difficulty is that, although the MS can measure the channel, it is the BS which needs the measured information to adjust its transmit weights. Also, there can be some additional complexity in that the MS must generally measure the channel of each transmit antenna separately, in addition to measuring the channel of the overall transmit (Tx) weight-adjusted signal. The latter measurement is required for the demodulation of the signal.

A number of methods for implementing TxAA algorithms have been proposed. According to some of these proposals, a few bits are allocated to the MS to encode the channel gain and phase. See, for example, Thomas Derryberry, Balaji Raghothaman (Nokia) "Transmit Adaptive Arrays without User Specific Pilot", document # C30-19990817-030, submitted to 3GPP2 August 1999; Mark Harrison (Motorola) "Tx AA Parameter Recommendations", document #C30-19990914-010, submitted to 3GPP2, Tokyo Japan, September 1999; and Mark Harrison, Kiran Kuchi (Motorola) "Open and closed loop transmit diversity at high data rates on 2 and 4 elements", document #C30-19990817-17, submitted to 3GPP2 August 1999. These methods do not allow the desired antenna weights to be precisely determined because the channel state must be distorted in order to be fed back to the BS with a low bit rate.

Typically, the academic literature has assumed that the full channel information is available at the transmitter, which is not a practical assumption. See, e.g., Jen-Wei Liang, Arogyaswami Paulraj "Forward link antenna diversity using feedback for indoor communication systems" Proceedings, 1995 International Conference on Acoustics, Speech, and Signal Processing, May 1995; Farrokh Rashid-Farrokhi, K. J. Ray Liu, Leandros Tassiulas "Transmit beamforming and power control for cellular wireless systems" IEEE Journal on Selected Areas in Communications, Vol. 16, No. 8, October 1998. There have been several submissions to the TIA standardization body for TxAA algorithms with channel feedback from MS to BS, some of which are referenced above. All of these submissions require that the MS measures a primary and secondary pilot transmitted from the primary and secondary antennae. Some submissions have shown that 4 antenna transmission can yield improved performance, however, with no recognition of the increased complexity at the MS.

The use of a few bits of channel feedback leads to substantial degradation relative to possible performance, because the feedback requires low bit rate quantization. Also, the MS must individually measure and transmit information for each antenna; the MS requires extra hardware to perform these functions. Furthermore, the above-described methods do not gracefully grow to accommodate an increase in the number of antennae.

The above-mentioned systems are illustrated in FIGS. 1–3, which illustrate a CDMA system. FIG. 1 shows a transmitter 10 with two antennae, a first antenna (antenna #0) 12 and a second antenna 14 (antenna #1). As is shown, different common pilot signals are associated with different antennae. For each user, such as user #0 and user #1, the transmitter 10 includes an adder, e.g., the adders, 16 and 18 respectively, that adds together a dedicated pilot signal for the user and the forward traffic for that user. For user #0, multipliers 20 and 22 multiply the summed signal with complex weights for the first and second antennae 12 and 14, respectively. For each antenna, the weighted user signals are summed by adders 24 and 26 and the result is added by adders 28 and 30 to the pilot signal for that antenna. It should be noted that FIG. 1 represents a complex baseband equivalent, as no RF modulation stage is shown.

FIGS. 2 and 3 show possible embodiments for receivers that may be used to receive signals transmitted by the transmitter 10. As shown in FIG. 2, a received signal is divided into three components: one signal corresponding to the dedicated channel, one signal corresponding to the common pilot for the first antenna and one signal corresponding to the common pilot for the second antenna. This division is accomplished by multipliers 32, 34 and 36 and accumulators 38, 40 and 42. A more hardware efficient embodiment is shown in FIG. 3, which employs multiplexer 44 and demultiplexer 46 to alternately select between the signals for the different transmit antennae. The time-multiplexed processing used by the embodiment of FIG. 3 saves hardware at the expense of 3 dB loss of precision for each channel. This tradeoff may be acceptable when a low bit rate, low precision channel reporting is used by the mobile to report these channel estimates to the BS.

The channel estimate attained by the mobile is coded into a low bit representation. The bit rates mentioned in the above cited references are 1, 2 or 4 bits (1b phase, 2b phase, or 3b phase+1b amplitude). So, for a forward channel vector c, the mobile generates the estimate ĉ, which is then quantized to produce the feedback estimate ĉ̂.

Note that the MS channel estimation hardware of FIGS. 2 and 3 can be used for an arbitrarily large number of Tx antennae, provided that there are unique pilot codes for each antenna and that the MS has information regarding these codes.

Finally, the proposed systems have the MS report the channel estimate based on 1 "path". In the presence of resolvable multi-path due to delayed reflections of the transmitted waveform, particularly for CDMA, there may be more than one path that is usable to the MS. In order to report the channel for N such paths, the MS-to-BS feedback rate would be required to increase N-fold, and the number of such paths would somehow need to be communicated to the BS. This solution is not practical however, and instead, the MS reports the channel estimate for only the strongest path. This solution discards some useful channel characteristics which could further increase performance under these circumstances.

The algorithm employed by the BS to utilize the received channel information would most likely be a simple matched transmission weighting. That is, the forward weights chosen would be the conjugate of the forward vector channel, so that the weights are determined as follows:

$$w = \hat{\hat{c}}.$$

This formulation attempts to maximize signal power to the mobile without regard to the locations of other mobiles. It does not steer nulls to the other mobiles. The channel estimate from a given mobile could be used to determine transmission nulls of other mobiles, but the coarseness of the channel estimate (no greater than 4 bits) makes this approach ineffective.

Schemes such as that shown in FIGS. 1–3 have significant disadvantages. In particular, as previously mentioned, the use of a few bits of channel feedback requires quantization, which leads to substantial degradation relative to the possible performance. Also, because an MS unit must individually measure and transmit information for each antenna, the MS requires extra hardware to perform these functions. Furthermore, the above-described methods do not grow gracefully in application to more antennae.

One method used by the present invention in implementing a TxAA algorithm (referred to as the "Adaptive Antenna Method and Apparatus") that overcomes these disadvantages is described in the above-incorporated U.S. Provisional Application No. 60/278,501, U.S. application Ser. No. 09/632,081 and hereinbelow. In accordance with this method, a transmitter includes hardware and/or software for adaptively updating weights for a plurality of antennae. In particular, according to the present invention, the transmitter generates a pair of test weight vectors, each vector comprising a plurality of complex entries, with each entry corresponding to a different one of a plurality of antennae. The first complex weight vector is equal to $$\frac{w_{base} + \beta \cdot v}{\|w_{base} + \beta \cdot v\|}$$

and the second complex weight vector is equal to $$\frac{w_{base} - \beta \cdot v}{\|w_{base} - \beta \cdot v\|},$$

where v is a test perturbation vector comprising a plurality of complex entries, with each entry corresponding to a different one of a plurality of antennae, β is an algorithm constant and $w_{base}$ is a vector that is updated based on feedback received from a receiver. The first and second complex weight vectors are applied to a dedicated pilot signal during alternate time intervals. During each time interval, the average of the first and second complex weight vectors is applied to the data traffic transmitted by the transmitter.

A receiver (e.g., a mobile station or ("MS")) alternately receives the pilot signal as multiplied by the first and second weight vectors as described above. The mobile station determines which of the weighted pilot signals resulted in a stronger signal received at the mobile and, based upon this determination, transmits feedback information. The transmitter receives the feedback and updates the first and second weights accordingly. In particular, if the first weight resulted in a stronger signal, $w_{base}$ is updated to become $$\frac{w_{base} + \beta \cdot v}{\|w_{base} + \beta \cdot v\|}$$

(the previous first weight) whereas if the second weight resulted in a stronger signal, w is updated to become $$\frac{w_{base} - \beta \cdot v}{\|w_{base} - \beta \cdot v\|}$$

(the previous second weight). The above-described process is repeated with the new $w_{base}$. New test vectors v are generated and applied after each MS channel measurement is made.

A disadvantage of the adaptive antenna method and apparatus and the other TxAA techniques described above with reference to FIGS. 1–3 is that these techniques may track weight vectors at a relatively slow rate. These techniques provide no mechanism for using partial knowledge of the channel, such as the channel gain vector autocorrelation. Thus, a need exists for a method and apparatus for improving transmit antenna weight tracking. Such a method should utilize existing TxAA techniques to improve the performance of a wireless communication system. The inventive method should not degrade performance due to quantization from utilizing a few feedback bits. In addition, the method and apparatus should be able to accommodate multiple antennas.

The present invention provides such a method and apparatus for improving transmit antenna weight tracking.

SUMMARY OF THE INVENTION

The present channel vector autocorrelation tracking technique improves weight vector tracking in a wireless communication system by taking advantage of knowledge of the correlation between elements of the channel gain vector. Several embodiments of the present invention are described hereinbelow.

In one embodiment of the autocorrelation tracking technique, the present invention extracts a biased gradient estimate by utilizing a correlated perturbation vector probing technique, where the perturbation vector is generated with a autocorrelation derived from an estimate of the channel vector autocorrelation matrix. The autocorrelation with which the perturbation vector is generated is selected such that the stronger subspaces of the channel autocorrelation are emphasized in the perturbation probing and update. This is desirable because these subspaces are more likely to be occupied by the channel vector at any given time than weaker subspaces, and thus the gradient estimate is biased to these emphasized subspaces. Specific embodiments use a perturbation autocorrelation given by an exponentiation of the estimate of the channel matrix added to an equi-diagonal matrix (i.e., scaled identity matrix).

The details of the embodiments of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Figure 1:
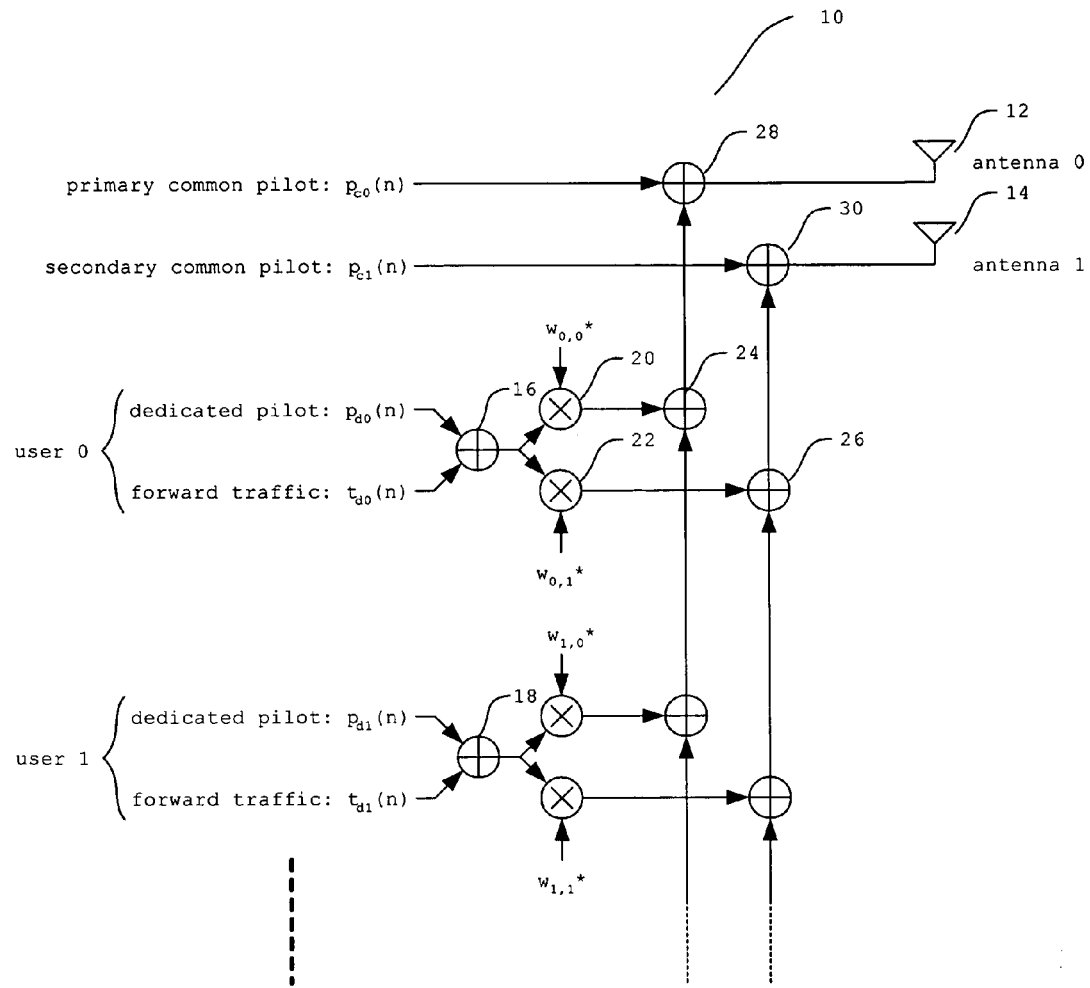
FIG. 1 is a simplified block diagram of one type of conventional two-antenna transmitter that employs antenna weighting derived from receiver feedback
Figure 2:
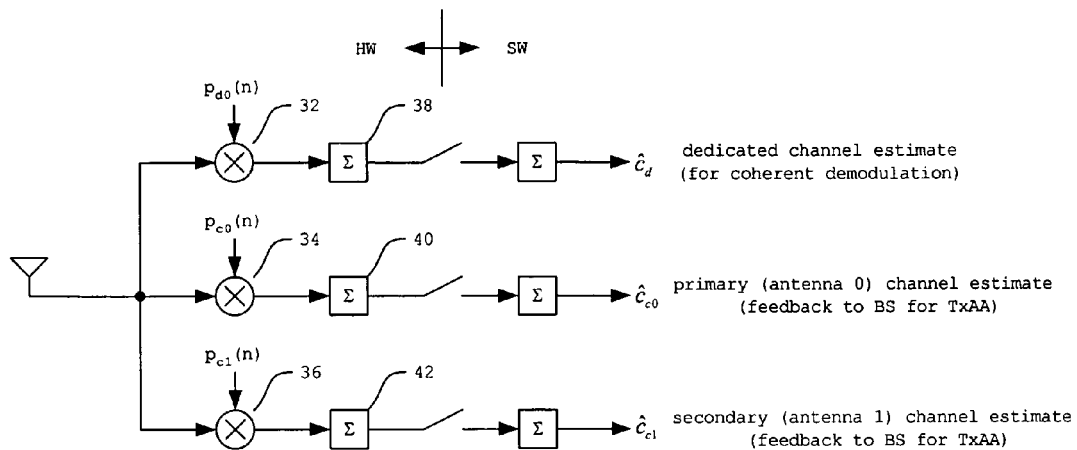
FIG. 2 is a simplified block diagram of a first type of conventional receiver that estimates the channel for each transmit antenna individually.
Figure 3:
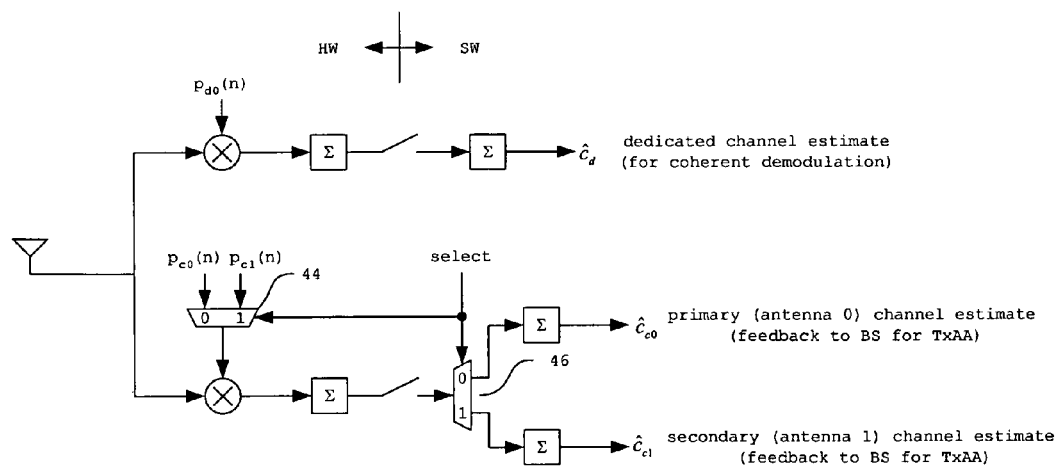
FIG. 3 is a simplified block diagram of a second type of conventional receiver that estimates the channel for each transmit antenna individually.

Throughout this description, the preferred embodiment and examples shown should be considered as exemplars, rather than as limitations on the present invention.

The method and apparatus of the present invention improves transmission weight vector tracking in a wireless communication system. The present invention improves weight vector tracking by utilizing one of several techniques described hereinbelow. The present invention can utilize one technique or any combination of techniques to improve weight vector tracking. According to this invention, an estimate of the autocorrelation matrix of the transmission channel gain vector is generated, and the perturbation vectors used for probing and gradient feedback are generated with an autocorrelation which is a function of the channel autocorrelation matrix estimate.

The present inventive method and apparatus is primarily intended for use in digital wireless communication systems. An exemplary DS-CDMA communication system adapted for use in the present generating transmit adaptive antenna weights using binary gradient feedback method and apparatus is described. However, as those of ordinary skill in the art shall recognize, any convenient wireless communication system can be used to practice the present invention. The communication system should allow the mobile station the capability of measuring radio frequency signal strengths and providing binary feedback to the base station. The present invention can be used in any wireless communication system where improving the tracking of weight vectors is desirable.

The following table defines some terms used throughout this description of the invention.

Nomenclature:

Vector and matrix variables are denoted in bold, scalars are not in bold.

Superscript "T" represents matrix or vector transposition.

Superscript "H" represents matrix or vector hermitian transpose (or conjugate transpose)

| Term | Definition of Term |
| --- | --- |
| AA | Adaptive antenna, more generally adaptive antenna algorithm. |
| BS | Base Station, fixed station which communicates with multiple mobile stations and provides their gateway to the fixed network. |
| CDMA | Code Division Multiple Access. |
| DS-CDMA | Direct Sequence CDMA. |
| Forward link | Radio link from the transmitting base station to the receiving mobile station. |
| HW | Hardware, referring to the fixed digital logic portion of a modem (as opposed to SW). |
| MS | Mobile Station, a user of the cellular network, e.g. a cell phone or a wireless data terminal. |
| pilot | A known signal or "training sequence" transmitted so that the receiver may use it to estimate the channel response. |
| reverse link | Radio link from the transmitting mobile station to the receiving base station. |
| Rx | Receive. |
| SW | Software, typically to distinguish the (modifiable) SW portion of a modem from the HW. |
| Tx | Transmit. |

Transmit Adaptive Antenna Weighting Embodiment

For clarity purposes, certain non-essential assumptions are made in the present detailed description. First, the wireless communication system described is assumed to be a DS-CDMA (Direct Sequence, Code Division Multiple Access) system that uses "pilots" (or "pilot channels") for use in performing coherent demodulation. In fact, most modern digital wireless systems include a pilot channel (sometimes known as a "training sequence", when the pilot channel is time multiplexed, rather than code multiplexed) which is used for channel estimation. Any such system can be used in practicing the present invention.

Second, the below described adaptive array transmitter is considered to exist in a base station and the receiver is a mobile station. This applies to cellular communication applications. In one embodiment, the mobile station may also have a transmit array operating in the same manner. Alternatively, the system that uses the present inventive method and apparatus may not be a cellular system, but rather, it may be a peer-to-peer communication system such as those defined by the Bluetooth™ Specification.

The invention as described can be applied without regard to how many antennae the transmitting BS is using, and in particular the MS does not need knowledge of the number of antennae being used.

Figure 4:
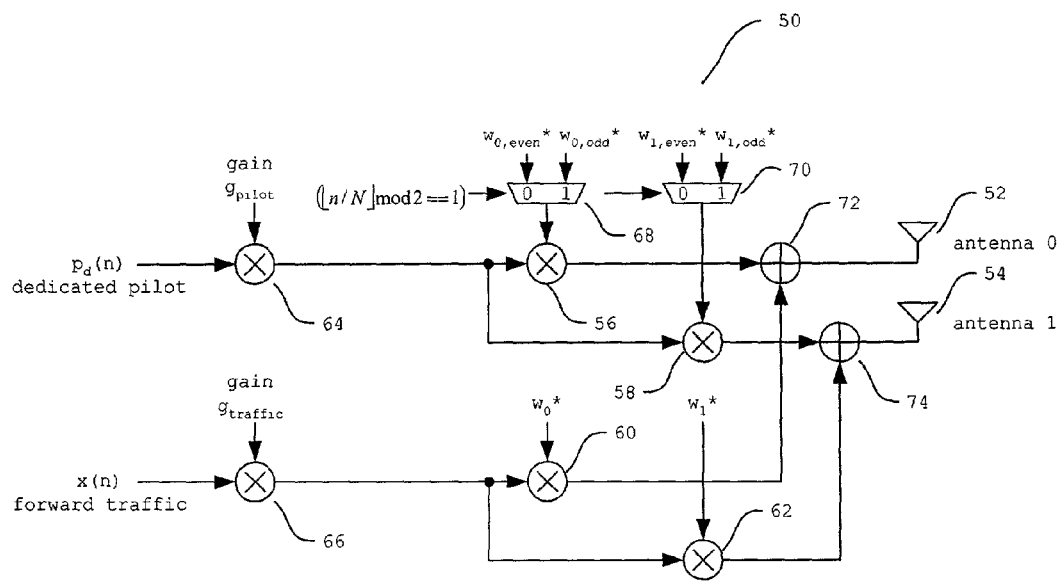
FIG. 4 is a simplified block diagram of one embodiment of a transmitter constructed according to the present invention.

FIG. 4 is a simplified block diagram of a BS transmitter 50 mode according to one possible embodiment of the present invention. For ease of illustration, two antennae, a first antenna 52 and a second antenna 54 are shown, but it will be appreciated that the present invention may easily be scaled to any number of antennae. Also for ease of illustration, although BS hardware corresponding to one mobile unit is shown, the transmitter 50 will typically have analogous hardware for a number of other users.

As shown in FIG. 4, the transmitter 50 comprises a plurality of multipliers 56, 58, 60, 62, 64 and 66, summers 72 and 74, and multiplexers 68 and 70. Multipliers 64 and 66 multiply a dedicated pilot signal and a forward traffic signal, respectively, with corresponding gains ("real valued"). Multipliers 60 and 62 multiply the forward traffic signal by weights that are components of the weight vector w, $w_0$ and $w_1$, where $w_0$ is the weight for the first antenna 52 and $w_1$ is the weight for the second antenna 54. The weight values are described below in more detail. $w_{0,odd}$ and $w_{0,even}$, weights from the weight vectors $w_{odd}$ and $w_{even}$ respectively, are provided as inputs to the multiplexer 68, which alternates between them. Similarly, $w_{1,odd}$ and $w_{1,even}$ weights are provided as inputs to the multiplexer 70, which alternates between them. The weighted traffic and pilot signals are summed by the summers 72 and 74 and transmitted by the first antenna 52 and the second antenna 54, respectively. The mathematical representation of the waveform transmitted by the antennae 52 and 54 is described below in more detail.

Figure 5:
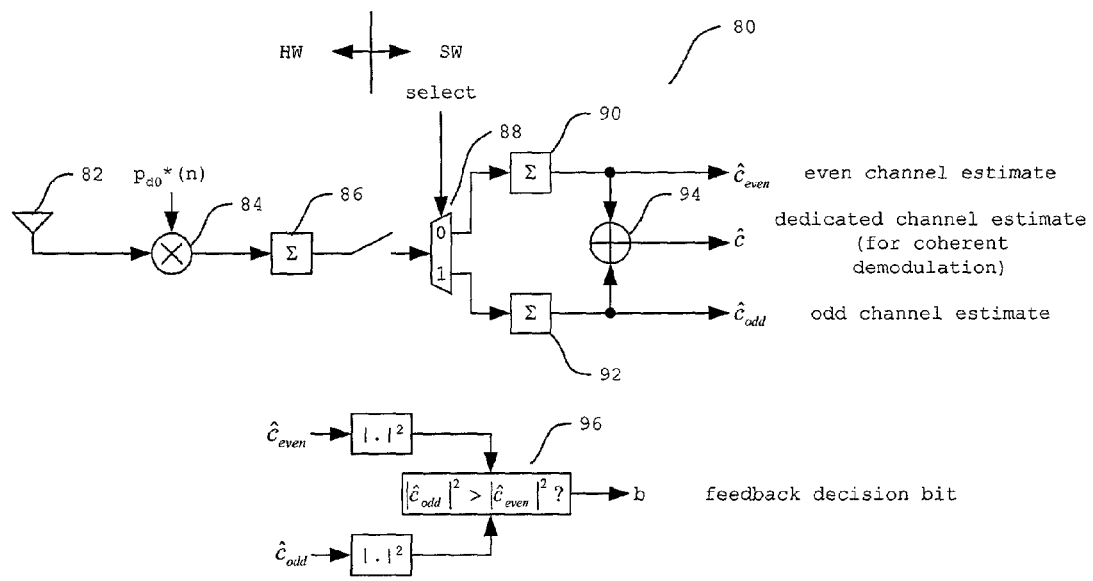
FIG. 5 is a simplified block diagram of one embodiment of a receiver constructed according to the present invention.

FIG. 5 is a simplified block diagram of an MS receiver 80 according to one possible embodiment of the present invention which demonstrates the principle of the feedback decision made by the MS. The receiver 80 comprises an antenna 82, a multiplier 84, and an accumulator 86. The receiver 80 further comprises a demultiplexer 88, accumulators 90 and 92 and a summer 94, which are preferably implemented in software. Signals received by the antenna 82 are multiplied by a pilot despreading code, as is well known in DS-CDMA systems, and the result is passed to accumulator 86, which accumulates a symbol from the chips it receives. "Even" and "odd" channel estimates are alternately accumulated in the accumulators 90 and 92. The even and odd estimates (i.e., the estimates for the alternating even and odd time slots) are summed by the summer 94 to generate a dedicated channel estimate (for coherent demodulation). Also, in a decision block 96 the power of the even and odd estimates are compared and the value of a feedback bit is set depending upon which of the two estimates indicates a greater power. In other words, the receiver 80 determines the power of the received pilot in the odd and even time slots, and determines whether the received power in the odd or the even slot was greater.

Figure 6:
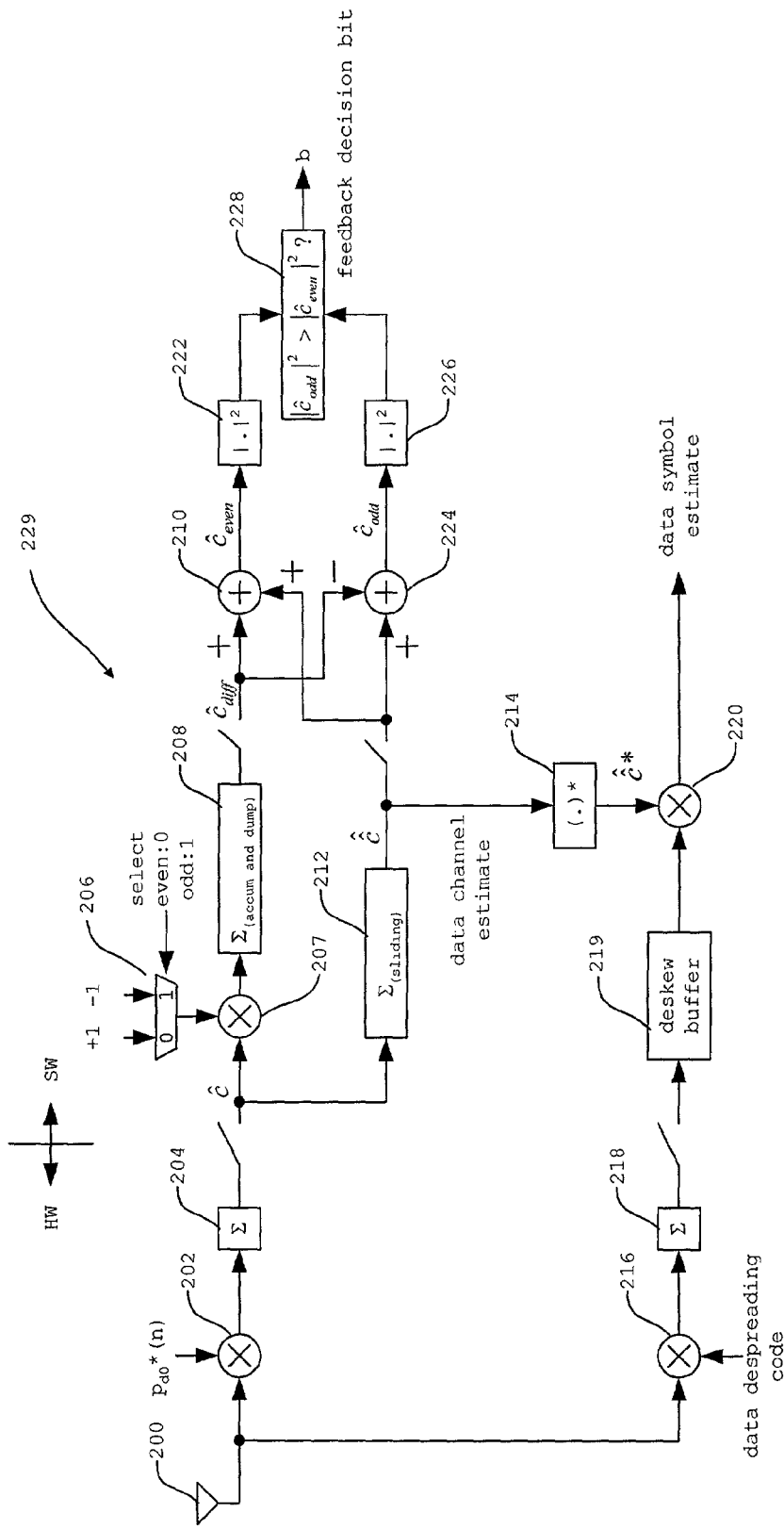
FIG. 6 is a block diagram of a preferred embodiment of a receiver constructed according to the present invention.

FIG. 6 is a block diagram of a preferred embodiment of a receiver (e.g., an MS) 229 constructed according to this invention. FIG. 6 illustrates the efficient use of the pilot format to both aid antennae adaptation and to demodulate incoming data. The pilot is used to extract a preliminary channel estimate $\hat{c}$ using the multiplier 202 and the accumulator 204. A sliding window filter 212 maintains the data channel estimate $\hat{c}$. The preliminary data symbol estimates are generated by multiplying the data despreading sequence with the received signal using a multiplier 216 and accumulating the result in an accumulator 218. These preliminary symbol estimates are then delayed in a deskew buffer 219. The data channel estimate $\hat{c}$ is conjugated in a conjugation unit 214 and multiplied with the preliminary data symbol estimates by a multiplier 220 to generate the final data symbol estimates. A channel difference estimate is simultaneously maintained through a separate data path. The preliminary channel estimate $\hat{c}$ is inverted for odd time slots and non-inverted for even time slots through the selection of the multiplexer 206 and application of ±1 in a multiplier 207, with this result accumulated in an accumulator 208 to generate $\hat{c}_{diff}$. When the measurement interval is complete, even and odd channel estimates are extracted from $\hat{c}_{diff}$ and $\hat{c}$ using adders 210 and 224. The more powerful channel estimate is then selected using a decision block 228.

In the case of resolvable multipath, the MS tracks several versions of the received pilot, making channel estimates for each one. In order to properly determine which Tx weight vector yields the best receive power, the MS additively combines the channel estimate powers from each path before performing a decision comparison. Similarly, if the MS 229 has multiple antennae, the decision is based on the sum of channel estimate powers over all antennae.

The same method can be applied to soft handoff, where multiple base stations may be transmitting the same data to the MS with individually adjusted TxAA weight vectors. That is, the processing of the MS can be applied to each BS individually, and the odd/even power summations used to determine the feedback bit is the summation of the powers for each path and for each BS. All BS's receive the same feedback bit and adjust accordingly. This is almost effectively considering the weight vector to be a concatenation of the individual BS weight vectors. Each BS individually normalizes its weight vector. The described method provides a very simple manner for the TxAA to be distributed across several BS's with no increase in MS complexity.

The following describes in greater detail the operation of the transmitter 50 and receiver 229 described above with reference to FIGS. 4 and 6, respectively. The following definitions are used in the description below with regard to the transmit adaptive antenna weighting technique:

| | |
|---|---|
| n | Time index, at the nyquist rate (chip rate for DS-CDMA). |
| m | Time index at decimated (slot) rate, $m = \lfloor n / N \rfloor$. |
| K | Number of users to which the BS is transmitting. |
| N | Duration of the pilot even/odd banking slot. |
| M | Number of slots between weight updates. |
| u(n) | Transmitted vector at time n, $[u]_i$ is the $i^{th}$ antenna. |
| w(n) | Antenna complex weights for the specific MS described, data channel. |
| $w_{even}(n)$ | Antenna complex weights for the specific MS described, even pilot channel. |

-continued

| | |
|---|---|
| $w_{odd}(n)$ | Antenna complex weights for the specific MS described, odd pilot channel. |
| $x(n)$ | Information bearing modulated signal for the specific MS described. |
| $p(n)$ | Dedicated pilot for the specific MS described. |
| $g_{pilot/traffic}$ | Gain for the pilot/traffic channel for the specific MS described. |

The complex baseband representation of the transmitted waveform at the antenna, characterizing the amplitude and phase of the modulated radio carrier transmitted by the antenna (such complex baseband representations are well known, see, e.g., John Proakis, *Digital Communications*, 1995, Third Edition, McGraw-Hill Inc., New York, N.Y.), is given as follows. The equation adds a subscript k differentiating the signals for the plural mobiles.

$$u(n) = \sum_{k=0}^{K-1} (g_{k,traffic} w_k *(n) x_k(n) + g_{k,pilot}((\lfloor n/N \rfloor \mod 2 = 0) w_{k,even} *(n) +$$

$$(\lfloor n/N \rfloor \mod 2 = 1) w_{k,odd} *(n)) p_k(n))$$

For conciseness of presentation, the following text focuses on the present invention's method from the point of view of a specific mobile with an arbitrary index k, and the subscript k is omitted.

In particular, the odd transmit weight is applied to the dedicated pilot on odd time slots and vice versa for the even weights. To ensure proper coherent demodulation, the even/odd weights are preferably constrained by the following relationship:

$$w(n) = \frac{w_{even}(n) + w_{odd}(n)}{2}$$

It is worth noting that when the odd and even test weights are generated by the perturbation technique described below in more detail, then it is valid to consider that $$w_{base}(n) \cong \frac{w_{even}(n) + w_{odd}(n)}{2},$$

and hence one may in that case use $w_{base}(n)$ as the weight vector applied to the data channel.

Figure 7:
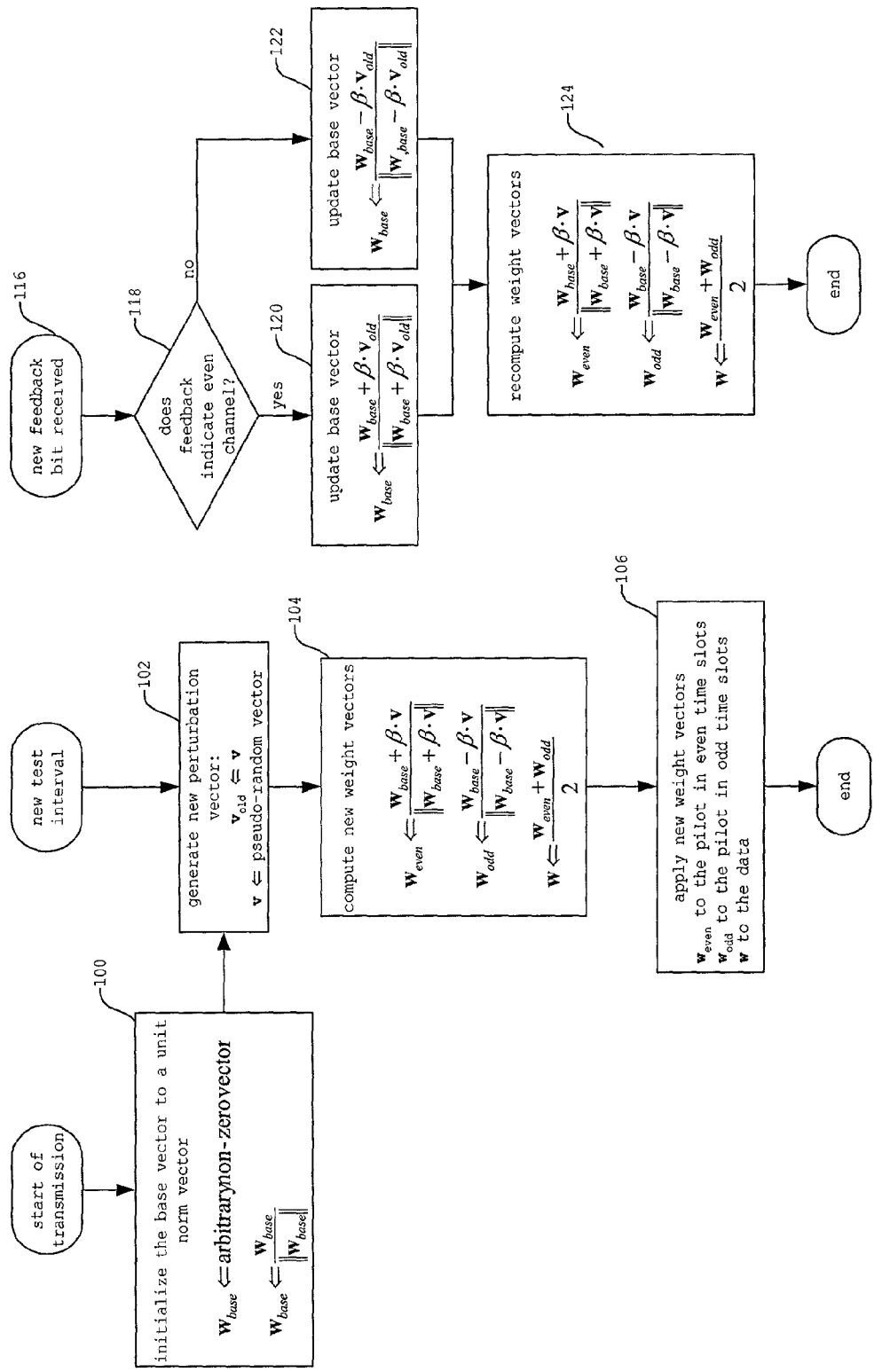
FIG. 7 is a flow chart that outlines pertinent features of the operation of the transmitter shown in FIG. 4.

FIG. 7 is a flow chart that outlines pertinent features of the operation of the transmitter 50. In block 100, a vector $w_{base}$ is initialized to an arbitrary vector with a unit norm. In block 102, a new test perturbation vector $v(n)$ is generated. Each vector entry is a complex number and corresponds to one of the antennae 52 or 54; each such entry therefore corresponds to a test weight to be applied to the transmission of the pilot signal over a particular antenna. The test perturbation vector is preferably determined in a manner such that its entries appear mutually independent. As a point of reference, it is assumed that the expected value (or long term average over many realizations) of the magnitude squared of each entry of v is 2, so that $E(\|v\|)=2 \cdot$(number of antennae). In this way, the amplitude of the applied perturbation is encompassed in the algorithm parameter β, as described below. For example, $v(n)$ could equal $[\pm 1 \pm j, \ldots \pm 1 \pm j]^T$ ($v(n)$ would have just two entries for the example transmitter of FIG. 4), where the +'s and −'s for the entries are randomly determined. However, the preferred $v(n)$ is a complex Gaussian vector of uncorrelated entries with variance of 2.

In block 102, the current value of v is stored as $v_{old}$ and a new value is determined for v. The old value is stored so that when the feedback is received at a later time (block 116) the transmitter 50 knows which perturbation vector the feedback corresponded to and can adapt accordingly. In block 104, even and odd weights and data channel weights are updated based on the new value for v. This is summarized as follows. When beginning of test interval, $v_{old} \Leftarrow v;$ $v \Leftarrow$ normalized test perturbation vector, new value every NM time indices;

$$w_{even} \Leftarrow \frac{w_{base} + \beta \cdot v}{\|w_{base} + \beta \cdot v\|};$$

$$w_{odd} \Leftarrow \frac{w_{base} - \beta \cdot v}{\|w_{base} - \beta \cdot v\|};$$

$$w \Leftarrow \frac{w_{even} + w_{odd}}{2}.$$

End.

Note: the base weight vector is only updated when feedback is received.

The normalization of the even/odd weight vectors is applied (the 2-norm is used) so that the total power transmitted in even and odd time slots is equal. This normalization prevents the MS 229 from simply selecting the weight vector with the larger transmit power. Rather, the MS 229 must select the weight vector which delivers the maximum power to the mobile for the given transmit power, which is determined by the traffic and pilot channel gains $g_{traffic}$ and $g_{pilot}$.

In block 106, the weights determined in block 104 are applied to the pilot signal. In particular, $w_{even}$ is applied to the pilot signal during even time slots and $w_{odd}$ is applied to the pilot signal during odd time slots, using the multiplexers 68 and 70 as is shown in FIG. 4. In addition, w is applied to the traffic signal during both even and odd slots. The pilot signal and the traffic signal, as modified according to block 104, are transmitted from the antennae 52 and 54. More precisely, a sinusoidal carrier wave is generated for each of the antennae 52 and 54. Each of these carrier waves is modulated by the traffic and pilot signals (modulating signals) as modified according to block 104. Viewed at from another perspective, the weight w adjusts the amplitude and phase of the plurality of radio carrier signals as those carrier signals are modulated by the traffic and pilot signals (modulating signals).

In block 116, which is shown as disjoint from blocks 100–106 for reasons that will be described below, the transmitter 50 receives a feedback bit transmitted by the MS 229. This feedback bit is based on the decision from the MS 229, which indicates which of the even or odd channels resulted in a greater received signal power and determines the weight updates for the transmitter 50. In block 118, the transmitter determines whether the even weight yields greater power by checking the value of the feedback bit. In one embodiment, a value of "0" indicates that the even channel is better. If so, control passes to block 120, which sets equal to $w_{even}$. In broader terms, $w_{base}$ is a function of $w_{even}$ and $w_{odd}$. In the preferred embodiment, the function is an 'or' type function but more complex functions of weight vectors, including combinations thereof, are contemplated by the present invention. Otherwise, control passes to block 122, which sets $w_{base}$ equal to $w_{odd}$. In block 124, the even and odd weights $w_{even}$ and $w_{odd}$ and the data weight w are updated based on the new $w_{base}$. This is summarized by the following pseudo-code:

when feedback received
    if (feedback==0, indicating even channel is better)

$$w_{base} \Leftarrow \frac{w_{base} + \beta \cdot v_{old}}{\|w_{base} + \beta \cdot v_{old}\|};$$

else $$w_{base} \Leftarrow \frac{w_{base} - \beta \cdot v_{old}}{\|w_{base} - \beta \cdot v_{old}\|};$$

end $$w_{even} \Leftarrow \frac{w_{base} + \beta \cdot v}{\|w_{base} + \beta \cdot v\|};$$

$$w_{odd} \Leftarrow \frac{w_{base} - \beta \cdot v}{\|w_{base} - \beta \cdot v\|};$$

$$w = \frac{w_{even} + w_{odd}}{2};$$

end

As noted above, block 116 (and related blocks) are shown as disjoint from blocks 100–106. This is because the processes represented by these two sets of blocks occur at different times, as can be seen from FIG. 10, a timing diagram that shows a possible timeline for weight adjustment and channel measurement. Waveform 130 shows the timing of updates to $w_{base}$, which are performed in blocks 120 and 122. Waveform 132 shows updates to v, which are performed in block 102. Waveforms 134 and 136 show updates to $w_{even}$ and $w_{odd}$, which are performed in blocks 104 and 124. Waveform 138 shows updates to the data channel weight vector w, which are performed in blocks 104 and 124.

As shown by the waveform 132, the test vector v (step 102) is periodically generated independently of feedback received from the MS 229. The updates to $w_{even}$ and $w_{odd}$ caused by a new value of v are indicated by solid vertical lines in the FIG. 10 while the updates to $w_{even}$ and $w_{odd}$ caused by feedback received from the MS 229 are indicated by the dashed vertical lines in the Figure.

The parameter β is an algorithm constant which is to be selected to improve performance. A large β allows the weight vector to adapt more quickly, but also introduces additional noise on the weight vector applied as a larger adjustment is made. For example, when the weights are settled near their optimal value, each weight is still constantly adjusted by ±βv. Also, β determines the size of the test perturbation applied to the weight vector, and hence will effect both the ability of the MS to correctly determine which test weight vector provides the larger power, and the amount of interference seen by other MS's. A larger β will cause the difference between the two test weight vectors to be larger, and hence it is more likely that this difference will exceed any noise contributions to the measurement by the receiver 80 or receiver 229. A larger β also causes more "splatter", wherein the antenna pilot transmission test weights are perturbed more from the base weights, which are adjusted towards an optimal value, and hence the odd/even pilots cause more interference to other MS's than the data weight. As an enhancement to the present invention, it is possible to individually tune these two effects (i.e., the adaptation rate vs. weight noise tradeoff, and the noise immunity vs. splatter tradeoff) with a $\beta_1$ and a $\beta_2$, as is described later.

Figure 8:
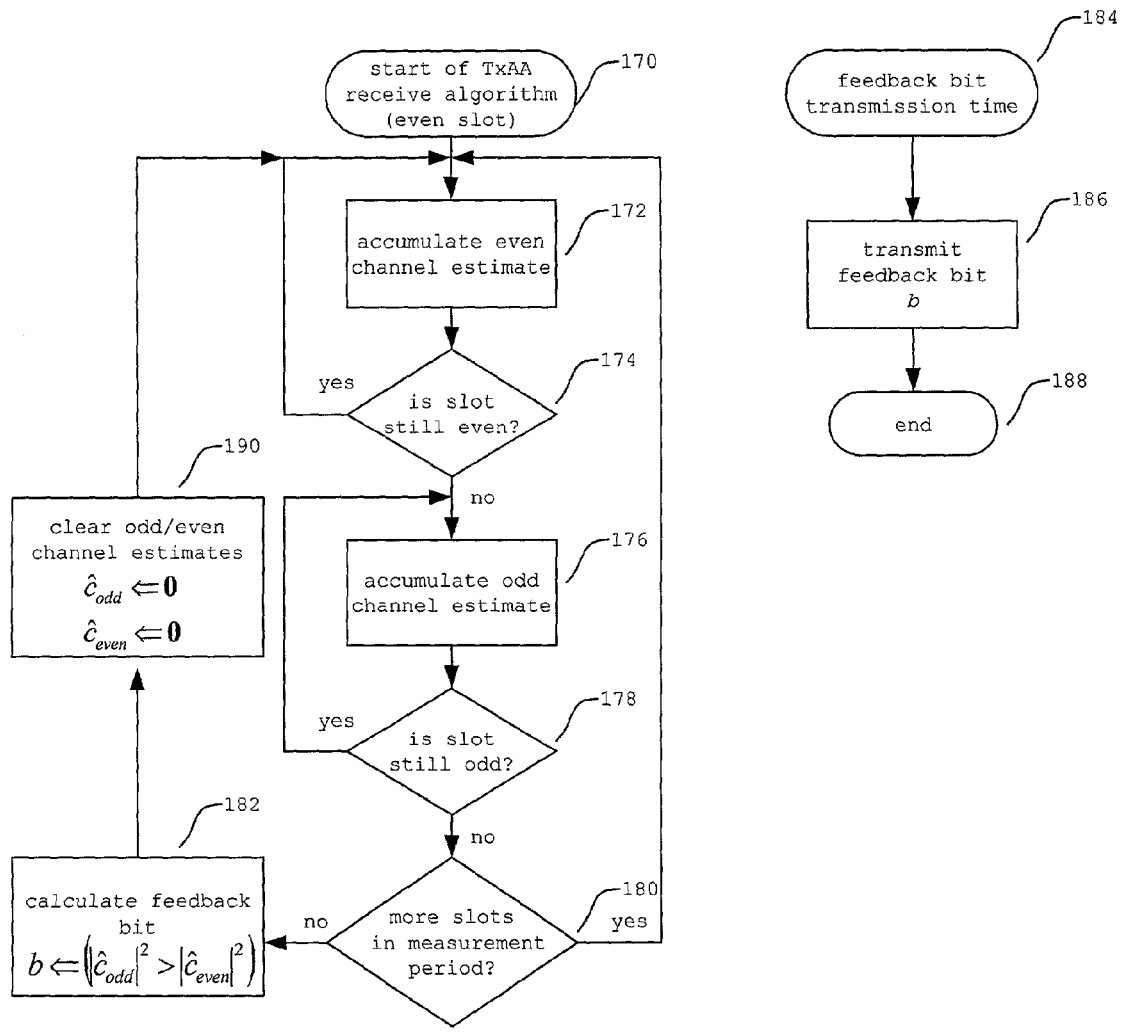
FIG. 8 is a flow chart that outlines pertinent features of the operation of the receiver shown in FIG. 5

FIG. 8 is a flow chart that outlines pertinent features of the operation of the receiver of FIG. 5. In block 172 the even channel estimate is accumulated, which continues during the entire even time slot according to the decision determined at decision block 174. At the beginning of the odd time slot, the odd channel estimate is accumulated in block 176, which continues during the entire odd time slot according to the decision determined at a decision block 178. The even/odd channel accumulations continue until it is determined by block 180 that the measurement period is complete. When the measurement period is determined to be completed, the feedback decision is calculated and the resultant bit stored for transmission at the appropriate time in block 182. The odd and even channel estimates are then cleared in block 190 and the process is repeated for the new measurement period by returning to the processing block 172. At the appropriate time, which is independent of the timing of the channel estimation procedure just described, the MS starts transmission of the feedback bit, which is shown in processing blocks 184, 186, and 188.

Figure 9:
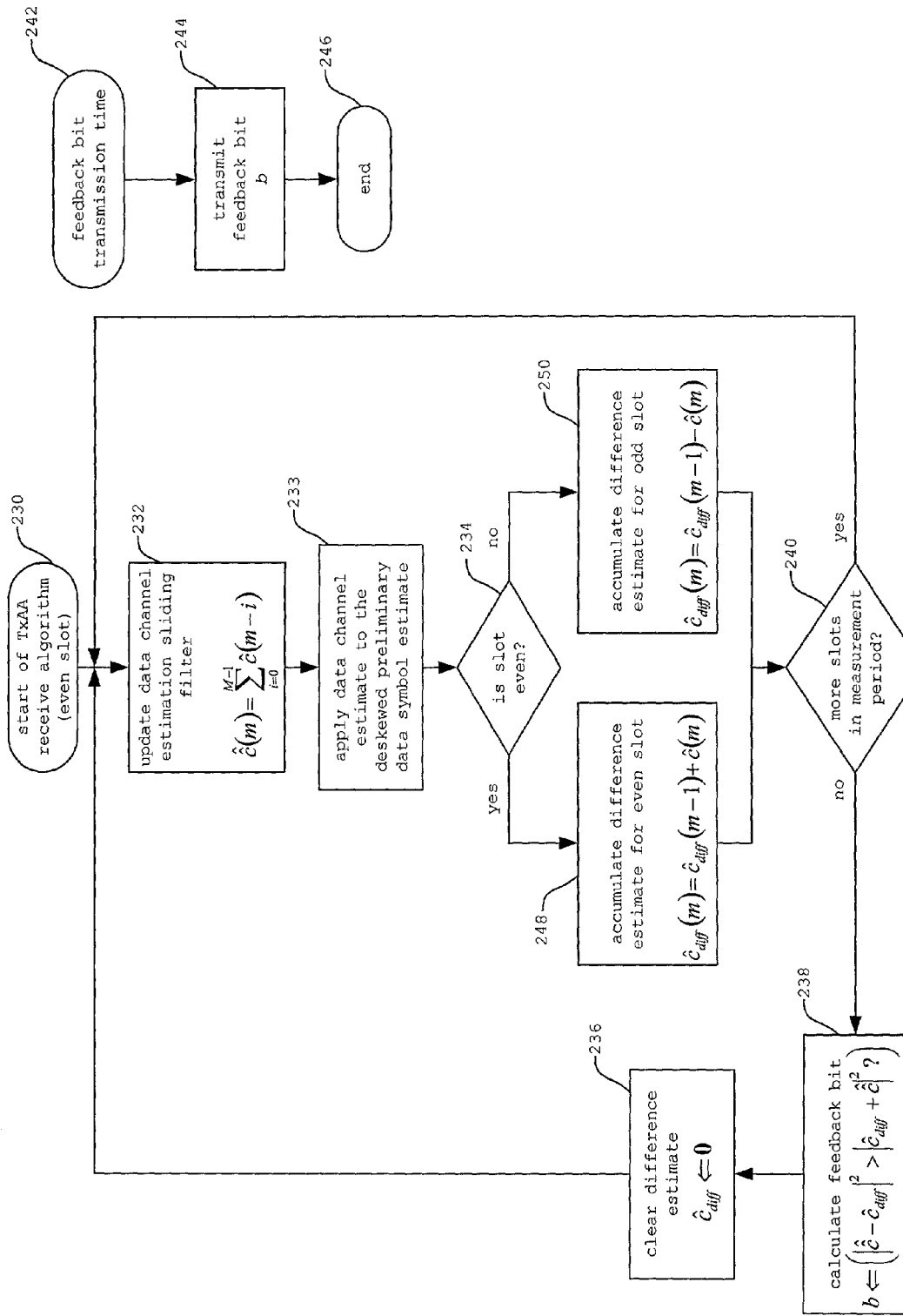
FIG. 9 is a flow chart that outlines pertinent features of the operation of the receiver shown in FIG. 6.

FIG. 9 is a flow chart which outlines the pertinent features of the operation of the receiver of the preferred embodiment of FIG. 6. In block 232 the sliding window data channel estimate is updated. The duration of the sliding window is shown as M slots, covering the duration of a measurement interval, as is preferred. The data channel estimate is applied to the preliminary symbol estimate in block 233. The state of the slot being processed is used in block 234 to determine the sign of the channel difference accumulation by adding the preliminary channel estimate in block 248 if it is an even slot, or subtracting the preliminary channel estimate in block 250 if it is an odd slot. Block 240 determines if the measurement interval is complete, continuing the process by returning to block 232 if the interval is not complete. When the measurement period is determined to be completed by block 240, the feedback decision is calculated and the resultant bit stored for transmission at the appropriate time in block 238. The difference estimate is then cleared in block 236 and the process returns to block 232. At the appropriate time, which is independent of the timing of the channel estimation procedure just described, the MS 229 starts transmission of the feedback bit, which is shown in blocks 242, 244 and 246.

Figure 10:
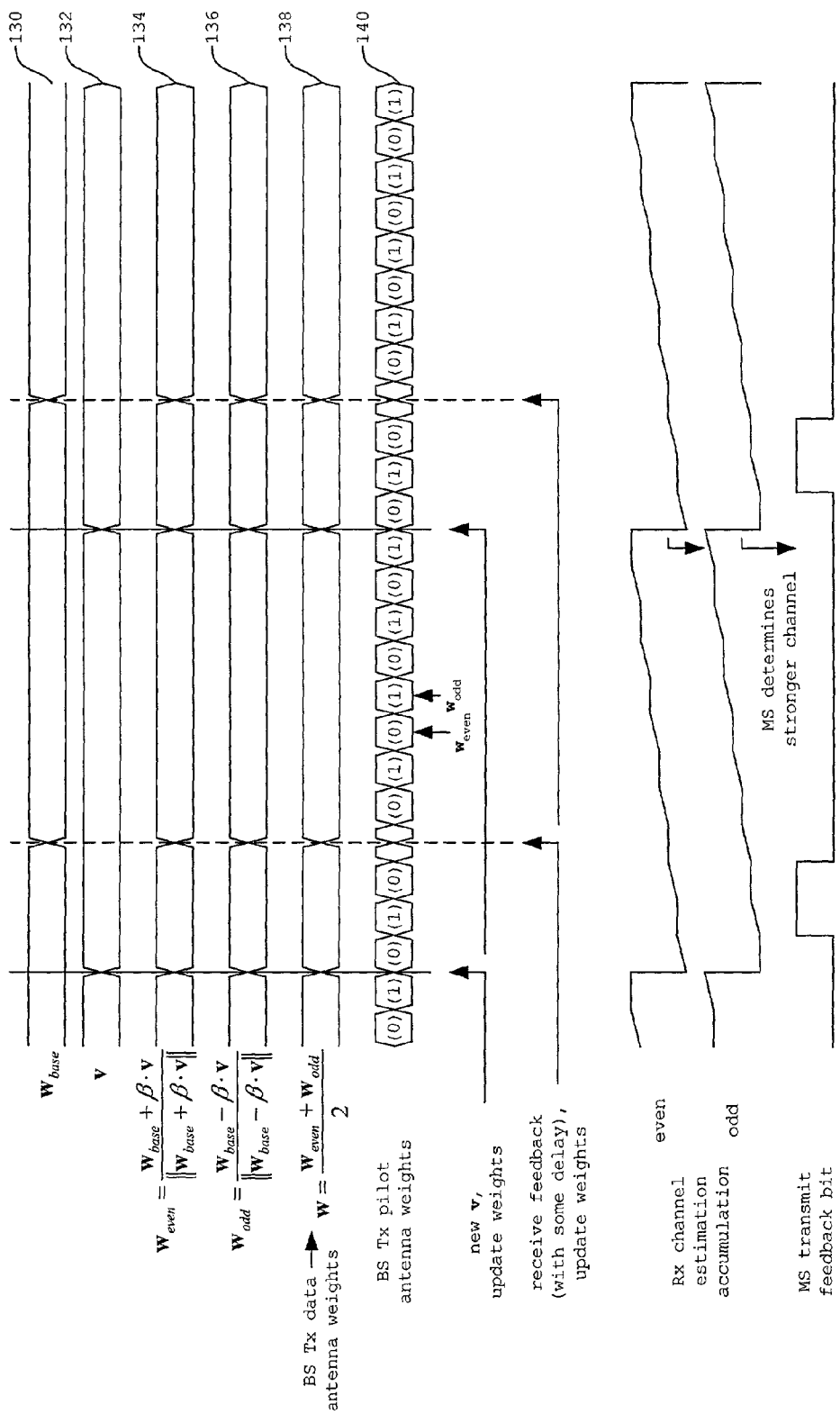
FIG. 10 is a timing diagram that shows a preferred timeline for weight adjustment, channel measurement and feedback.

FIG. 10 shows a time line of this process with certain parameters selected by way of example. The accumulations for this example are over 12 time slots, the feedback bit is transmitted one time slot later, and the transmit weight update occurs as soon as the transmitter 50 receives it. In this case, the transmitter 50 updates the test perturbation vector v prior to receiving the update, so that the measurement of the new perturbation can begin. Because each update is fairly small, the measurement of the new perturbation will be insignificantly modified by the overlap.

As previously described with reference to FIG. 7, at the beginning of each test period, the transmitter 50 determines a new perturbation vector v and applies it to the old $w_{base}$. As soon as the feedback arrives, this same new v is applied to the new $w_{base}$. This allows for maximizing the measurement interval without delaying the next test perturbation.

Because the updates are relatively small, the new perturbation will still yield a valid measurement result even though it is applied to both the old and the new $w_{base}$.

The invention may be implemented for "soft handoff" systems. Soft handoff in DS-CDMA systems is an operational mode wherein multiple BS's, each using a different spreading code, transmit the same data to a single MS. The reception at the mobile of these multiple signals benefits performance by providing diversity. According to one embodiment of the present invention, soft handoff may be implemented in the following manner. Each BS independently generates test weight vectors $w_{odd}$ and $w_{even}$ through the independent generation of test perturbation vectors v. Each BS transmits the pilot and data as previously described. The MS makes a single decision based on the summation of the channel estimate powers for all BS's, and transmits a single feedback bit as previously described. Each BS independently implements the weight adaptation as previously described, without regard to the fact that it is in soft handoff mode. In summary, the MS uses the summation of all BS powers for the decision, and each BS behaves exactly as though it would even if not in soft handoff mode.

The application of the system described herein to the IS-95 standard and its derivative cdma2000 most likely would use N=64 chips (chip rate 1.2288 MHz, giving 52.083us time multiplexing) and 1.25 ms decision intervals. The length of the total even/odd accumulation is implementation specific in the mobile, but probably 8N, 12N, 16N or 24N (½ of that for each of the even/odd accumulations). Another possible alternative would be 0.625 ms decision intervals, in which case the total even/odd accumulation would probably not exceed 12N. These timings fit well into the existing specification as 64 chips is the original symbol duration from IS-95 and still a common time unit, and 1.25 ms is a "power control group", the timing upon which over-the-air closed loop power control updates take place, and is 1/16 of the most common frame length, 20 ms. It will be appreciated that the present invention is not limited to any of the specific quantities described above.

Some Alternate Embodiments

It will be appreciated that it is possible to use more than 2 time slots and a corresponding number of test weight vectors, which may be generated from a corresponding number of test perturbation vectors. Also, more than 1 bit can be used as feedback, corresponding to a greater number of time slots.

The generation of the test perturbation v can be implemented in many ways. Such generation should be pseudo-random so that over the long term the summation $\Sigma vv^H$ approaches an equi-diagonal matrix. The random elements can be generated as some probability distribution other than the binary one described (e.g., uniform distribution, Gaussian distribution). Rather than pseudo-random generation, the vector can be generated by cycling through some fixed sequence. For example, the sequence $[1\ 0\ 0\ \ldots\ 0]^T$ $[j\ 0\ 0\ \ldots\ 0]^T$ $[0\ 1\ 0\ \ldots\ 0]^T$ $[0\ j\ 0\ \ldots\ 0]^T$ $\ldots$ can be selected in one embodiment, to scan through each weight independently. This satisfies the requirement on the long term summation of $vv^H$.

The value of β can itself be adaptive. For fast varying channels, the value could be made larger, and for slower channels it could be made smaller. This would allow for some optimization of β with respect to channel variation rate.

The weight update can be further parameterized, allowing independent optimization of the adaptation rate vs. weight noise ($\beta_1$) and the measurability in noise vs. splatter ($\beta_2$) tradeoffs. $\beta_1$ is then applied to the update of $w_{base}$, while $\beta_2$ is applied to the test weight vectors $w_{odd}$ and $w_{even}$. This can be performed in accordance with the following pseudo-code:

when feedback received or new test interval
  if (new test interval)
    $v_{old} \Leftarrow v$
    $v \Leftarrow$ normalized test perturbation function
  end
  if (feedback received)
    if (feedback==0, indicating the even channel was better)

$$w_{base} \Leftarrow \frac{w_{base} + \beta_1 v_{old}}{\|w_{base} + \beta_1 v_{old}\|};$$

else $$w_{base} \Leftarrow \frac{w_{base} - \beta_1 v_{old}}{\|w_{base} - \beta_1 v_{old}\|};$$

end
  end $$w_{even} \Leftarrow \frac{w_{base} + \beta_2 v}{\|w_{base} + \beta_2 v\|};$$

$$w_{odd} \Leftarrow \frac{w_{base} - \beta_2 v}{\|w_{base} - \beta_2 v\|};$$

$$w \Leftarrow \frac{w_{even} + w_{odd}}{2};$$

end

The parameters used in the time line of FIG. 10 are exemplary only and can be easily modified.

The exact nature of the feedback channel is not specified. It can be implemented as a puncturing onto the data channel as the power control bit is implemented in IS95, or onto the pilot channel as in IS-2000, or in some other manner.

The MS can generate the channel estimations in a different manner than described.

The weight normalization described above is a total power normalization. Other normalizations can be chosen.

Alternate treatments of soft handoff can be used, though the previously described method is preferred. Rather than using only 1 feedback bit, a feedback bit may be included for each such base station (or each such BS that has adaptive Tx antennae enabled) so that the mobile can send commands to each, or alternatively can time-multiplex the feedback bits between the various BS's. The latter would result in a significant loss of performance to accommodate the slower adaptation times.

The test weights $w_{odd}$ and $w_{even}$ are described as being applied in separate time slots. It is possible to use other orthogonal modulation techniques such that they may be extracted. For example, rather than an odd and even time slot, odd and even orthogonal codes (perhaps from a set of Walsh codes) could be used. This is not desirable for the preferred embodiment but may be desirable in other embodiments.

While the transmission medium is assumed to be the propagation of radio waves from transmitting antennae to a receiving antenna (or antennae), the invention is obviously extendable to the propagation of waves in other media. For example, the medium could be acoustic waves in a fluid or gas, from transmitting transducers to a receiving transducer (or transducers).

Channel Autocorrelation Tracking Technique

The channel autocorrelation tracking technique described herein improves weight vector tracking in a wireless communication system by taking advantage of knowledge of the correlation between elements of the forward channel gain vector. The present invention is particularly well suited for communication systems that utilize transmit adaptive antenna techniques. The present invention improves weight vector tracking by utilizing one of several techniques described hereinbelow. Several embodiments of the present inventive channel autocorrelation tracking technique are described hereinbelow. The present invention can utilize one embodiment or any combination of embodiments to improve weight vector tracking in wireless communication systems.

In one embodiment of the autocorrelation tracking technique, the present invention extracts a biased gradient estimate by utilizing a correlated perturbation vector probing technique, where the perturbation vector is generated with a autocorrelation derived from an estimate of the channel vector autocorrelation matrix. The autocorrelation with which the perturbation vector is generated is selected such that the stronger subspaces of the channel autocorrelation are emphasized in the perturbation probing and update. This is desirable because these subspaces are more likely to be occupied by the channel vector at any given time than weaker subspaces, and thus the gradient estimate is biased to these emphasized subspaces. Specific embodiments use a perturbation autocorrelation given by an exponentiation of the estimate of the channel matrix added to an equi-diagonal matrix (e.g., scaled identity matrix).

The inventive channel autocorrelation tracking technique extracts a coarse gradient estimate by applying perturbation vectors to a weight vector; wherein the method utilizes a gradient feedback algorithm for adaptation of transmit antenna baseband weights using 1-bit feedback. In accordance with the present invention, the channel autocorrelation tracking technique determines a class of perturbation vectors for improving tracking when the channel gain vector contains correlated elements. A basic binary gradient feedback algorithm of the above-described TxAA Weighting Embodiment that is adapted for use with the present invention is now described in some detail.

The following definitions are used in the description below.

| | |
|---|---|
| receive unit | The unit which is receiving the signals which are sent according to the transmit weight adaptation algorithm, generally referred to as the mobile station. This unit is also actively transmitting, as at a minimum the feedback information must be transmitted to the "transmit" unit, and probably there is other reverse traffic and signaling. |
| transmit unit | The unit which is transmitting the signals which are sent according to the transmit weight adaptation algorithm, generally referred to as the base station. This unit is also actively receiving, as at a minimum the feedback information must be received from the "receive" unit, and probably there is other reverse traffic and signaling. |
| $\|\ \|$ | Matrix or vector norm by some defined norm, most often the 2-norm. |
| $\|\ \|_2$ | Matrix or vector 2-norm. For a vector x, the two norm is $\|x\|_2 \equiv \sqrt{x^H x}$. For a matrix A, the two norm is $$\|A\|_2 \equiv \sqrt{\max_{x, \|x\|_2=1} (x^H A^H A x)}.$$ |
| $\|\ \|_{tr}$ | Matrix "trace norm". For a K-by-K matrix A, the trace norm is the sum of the absolute values of the diagonals divided by the number of such diagonals, $$\|A\|_{tr} \equiv \frac{1}{K} \sum_{k=0}^{K-1} |a_{k,k}|.$$ The matrices of interest are typically non-negative definite, so that the diagonals are non-negative and $$\|A\|_{tr}|_{A \text{ non-negative def}} \equiv \frac{1}{K} \sum_{k=0}^{K-1} a_{k,k}.$$ |
| n | Time index, at the nyquist rate. |
| K | Number of users to which the BS is transmitting. |
| L | Number of transmit antennas. |
| N | Duration of the pilot even/odd banking slot. |
| M | Number of slots between weight updates. |
| u(n) | L-by-1 vector, transmitted vector at time n, $[u]_j$ is the $j^{th}$ antenna. |
| $c_f(n)$ | L-by-1 vector, forward channel gain vector, complex gain from each antenna of the Tx unit to the antenna of the Rx unit. |
| $c_r(n)$ | L-by-1 vector, reverse channel gain vector, complex gain from the antenna of the Rx unit to each antenna of the Tx unit. |
| w(n) | L-by-1 vector, antenna complex weights for the MS data channel. |
| $w_{even}(n)$ | L-by-1 vector, antenna complex weights for the MS, even pilot channel. |
| $w_{odd}(n)$ | L-by-1 vector, antenna complex weights for the MS, odd pilot channel. |
| v(n) | L-by-1 vector, test perturbation to the complex weight. |
| x(n) | Information bearing modulated signal. |
| p(n) | Dedicated pilot. |
| $g_{pilot/traffic}$ | Gain for the pilot/traffic channel for user. |

The basic binary gradient feedback algorithm of the TxAA Weighting Embodiment that is adapted for use with the present invention incorporates a simple implementation of the TxAA Weighting Embodiment. In accordance with the basic binary gradient feedback algorithm, transmitted waveforms are described for only one user (e.g., a receiver), while multiple waveforms are summed for multiple receivers. The complex baseband representation for K users of a transmitted waveform given by the complex conjugate of u(n) is given as follows, where the subscript k is added to denote the distinct users:

$$u(n) = \sum_{k=0}^{K-1} (g_{k,traffic} w_k * (n) x_k(n) + g_{k,pilot}((\lfloor n/N \rfloor \bmod 2 = 0) w_{k,even} * (n) + (\lfloor n/N \rfloor \bmod 2 = 1) w_{k,odd} * (n)) p_k(n))$$

Since the processing at the transmitting unit and the receiver unit is the same for all K users and is independent of the user K−1 users, the subscript k will be excluded from the following detailed description.

Thus, given the forward channel gain vector $c_f$, the waveform received at the antenna of the receive unit is as follows:

$$r_{rx}(n) = u^T(n)c_f(n)$$
$$= w^H(n)c_f(n)g_{traffic} + g_{pilot}((\lfloor n/N \rfloor \bmod 2 = 0)w_{even}^H(n)c_f(n) +$$
$$(\lfloor n/N \rfloor \bmod 2 = 1)w_{odd}^H(n)c_f(n)p(n)$$

Maximizing the received power for the user for a constrained weight vector norm results in the following ratio:

$$w = \frac{c_f}{\|c_f\|_2}$$

This ratio, w, is the weight vector to which the algorithm converges.

In accordance with the binary gradient feedback algorithm, odd transmit weights are applied to dedicated pilots during odd time slots and even transmit weights are applied to dedicated pilots during even time slots. In a receiver coherent demodulation embodiment, the algorithm constrains even/odd weights according to the following relation:

$$w(n) = \frac{w_{even}(n) + w_{odd}(n)}{2}$$

Receivers select the better of the even/odd to generate feedback. The algorithm generates channel estimates for even and odd weights. The summation of even and odd weights generates data channel estimates that are utilized for coherent demodulation. The difference of the squares of even and odd weights can be utilized to generate a feedback bit. In one exemplary embodiment, a logical zero value is arbitrarily defined as a condition when the even channel yields greater power and conversely a logical one value is defined as a condition when the odd channel yields greater power. In a resolvable multipath embodiment, receivers track several versions of a received pilot and determine channel estimates for each version. Prior to a decision comparison, receivers additively combine channel estimate powers from each path to determine which Tx weight vector yields the best receive power. Receivers transmit the same feedback bit(s) to all base stations when in soft handoff modes of operation. Base stations utilize this feedback to generate new transmit weights according to the following pseudo-code:

when feedback received $$v\left(\left\lfloor \frac{n}{NM} \right\rfloor\right) = \begin{array}{l} \text{normalized test perturbation function,} \\ \text{new value every } NM \text{ time indices} \end{array}$$

if (feedback==0)

$$w_{base} \Leftarrow \frac{w_{base} + \beta \cdot v\left(\left\lfloor \frac{n}{NM} \right\rfloor - 1\right)}{\left\| w_{base} + \beta \cdot v\left(\left\lfloor \frac{n}{NM} \right\rfloor - 1\right) \right\|_2}$$

else $$w_{base} \Leftarrow \frac{w_{base} - \beta \cdot v\left(\left\lfloor \frac{n}{NM} \right\rfloor - 1\right)}{\left\| w_{base} - \beta \cdot v\left(\left\lfloor \frac{n}{NM} \right\rfloor - 1\right) \right\|_2}$$

end $$w_{k,even} \Leftarrow \frac{w_{base} + \beta \cdot v\left(\left\lfloor \frac{n}{NM} \right\rfloor\right)}{\left\| w_{base} + \beta \cdot v\left(\left\lfloor \frac{n}{NM} \right\rfloor\right) \right\|_2}$$

$$w_{odd} \Leftarrow \frac{w_{base} - \beta \cdot v\left(\left\lfloor \frac{n}{NM} \right\rfloor\right)}{\left\| w_{base} - \beta \cdot v\left(\left\lfloor \frac{n}{NM} \right\rfloor\right) \right\|_2}$$

$$w \Leftarrow \frac{w_{even} + w_{odd}}{2}$$

end

Test perturbation vectors can be generated by a plurality of methods, however they are normalized so that β captures the tracking rate. Utilizing a larger β yields faster tracking with larger tracking noise. The operation of the channel autocorrelation technique is now described.

The channel autocorrelation tracking technique described hereinbelow utilizes a perturbation vector generated as a random gaussian vector having a perturbation vector autocorrelation, $R_v$. The following equation represents the perturbation vector autocorrelation of the basic binary gradient feedback algorithm:

$$R_v = E(vv^H) = 2I$$

When the forward channel gain elements are independent, identically distributed (iid), and thus uncorrelated, the forward channel autocorrelation estimate can be represented by the following equation:

$$R_f = E(c_f c_f^H) = \alpha^2 I; \text{ for some scalar } \alpha.$$

When the forward channel vector has this form and is uncorrelated, the uncorrelated perturbation vector is appropriate. However, when the forward channel vector does contain correlation, a modified perturbation vector can be applied using an estimate of the forward channel gain vector autocorrelation matrix.

The forward channel vector autocorrelation matrix estimate can be assisted by a parameterized approach, where the angle of arrival and angular spread of the multiple reflection paths between the transmitter antennas and the receiver are estimated. These parameters can be plugged into a parameterized autocorrelation matrix formula (several are available in the literature, see e.g. K. I. Pedersen et al "A Stochastic Model of the Temporal and Azimuthal Dispersion Seen at the Base Station in Outdoor Propogation Environments," *IEEE Transactions Vehicular Technology*, Vol. 49, No. 2, March 2000) to provide an estimate, which could be used to assist in the overall matrix estimate. This parameterized approach could be used by itself or averaged with the other forward and reverse autocorrelation matrix estimates (e.g., above-described estimates). Note that the term "angle of arrival" is generally used to describe the angle of a particular path between antennas regardless of whether a radio wave is "departing" (i.e., being transmitted) or "arriving" (i.e., being received). Knowledge of the geographical position of a mobile station can also aid in the overall matrix estimate. Any of several well-known methods of determining the geographical position of a mobile station can be used with the present invention, for example, a Global Positioning System (GPS).

In general, it is unlikely that forward channel gain elements are uncorrelated. The present invention advantageously forces the perturbation vector to be larger in the subspaces in which the channel vector c is more likely to occupy so that unnecessary weight noise is not added into subspaces that are unlikely or impossible for c to occupy. Accordingly, a reasonable perturbation vector autocorrelation can be represented by the following Equation 1:

$$R_v = 2\left(a \frac{R_f}{\|R_f\|} + (1-a)I\right) \quad \text{Equation (1)}$$

The embodiment of Equation 1 uses a normalization of $R_f$. In one embodiment, the present inventive channel autocorrelation tracking technique utilizes a norm referred to as a trace norm. Advantageously, the trace norm is relatively easy to calculate. One skilled in the communication art shall recognize that any method of calculating the norm can be utilized with the present invention without departing from the scope the absolute values of the diagonal elements of the matrix divided by the number of such diagonal elements.

Equation 1 allows the present inventive technique to provide improved tracking when the channel vector is correlated and normal tracking (i.e., default perturbation of a TxAA weighting technique) when the channel vector is uncorrelated. In accordance with the present channel autocorrelation tracking technique, a is an algorithm parameter, wherein $0 \leq a \leq 1$. The parameter a is applied as in Equation 1, which ensures that all modes of the system can be exercised even if that mode is small in the autocorrelation matrix. In practical applications, the autocorrelation matrix is an estimate and the exact value is not known, and thus the algorithm parameter, a, ensures that all subspaces are exercised. For example, if the estimate is from the Tx weight vector, the initial autocorrelation matrix has a nullspace, and a=1, then the nullspace will never be exercised by the weights, and thus never added to the adapted autocorrelation matrix estimate. Similarly, the actual channel autocorrelation matrix may change slowly over time so that subspaces which were previously null may become active. Setting a<1 ensures that all subspaces are exercised and the autocorrelation matrix estimate can continue to evolve without excluding the future possibility of active subspaces that are currently null.

The operation of the channel autocorrelation tracking technique is summarized in the following steps:

(a) determining channel autocorrelation matrix estimates ($R_f$, $R_r$);
(b) determining a peturbation vector autocorrelation ($R_v$) based on the autocorrelation matrix estimate; and
(c) determining a weight vector (w) based on the perturbation vector autocorrelation by a TxAA algorithm and feedback from the receiver.

Three embodiments of the channel autocorrelation tracking technique are described hereinbelow. The first channel autocorrelation technique of the present invention is now described in some detail.

Channel Autocorrelation Tracking Technique—A First Embodiment

The first embodiment of the channel autocorrelation tracking technique of the present invention extracts a coarse gradient estimate by utilizing a correlated perturbation vector probing technique, where the perturbation vector is generated with a autocorrelation derived from an estimate of the channel vector autocorrelation matrix. The autocorrelation with which the perturbation vector is generated is selected such that the stronger subspaces of the channel autocorrelation are emphasized in the perturbation probing and update. Specifically, the first embodiment utilizes a TxAA algorithm to generate perturbation vectors by applying perturbation vector autocorrelation matrix estimations using both forward and reverse channel estimators. The perturbation vectors are utilized by the TxAA algorithm to generate weight vectors. An exemplary TxAA algorithm is described above with reference to the TxAA weighting embodiment. One skilled in the communication art shall recognize that any TxAA algorithm can be utilized with the present channel autocorrelation technique without departing from the scope or spirit of the present invention. The present channel autocorrelation tracking technique advantageously improves tracking when a channel gain vector contains correlated elements. The operation of the first embodiment of the channel autocorrelation tracking technique is summarized in the following steps:

(a) determine a channel vector autocorrelation matrix estimate;
  i. calculate a forward channel autocorrelation matrix estimate ($R_f$);
  ii. calculate a reverse channel autocorrelation matrix estimate ($R_r$);
(b) determine a perturbation vector autocorrelation ($R_v$) based on the forward and reverse channel autocorrelation matrix estimates; and
(c) determine a weight vector (w) based on the perturbation vector autocorrelation by a TxAA algorithm.

The first embodiment of the channel autocorrelation tracking technique is a linear approach that utilizes the forward and reverse channels to estimate the autocorrelation matrix and apply the estimate to Equation 1. In accordance with STEP (a)(ii) of the first embodiment, the reverse channel estimate is determined by estimating the reverse channel gain vector through standard system procedures. For example, the reverse channel gain vector, $\hat{c}_r(n)$, can be determined by multiplying the Rx waveform at the transmitting unit (e.g. a base station) by a local version of the reverse channel pilot sequence conjugated and filtering the result as is well known to anyone skilled in the pilot assisted CDMA communication art. In accordance with STEP (a)(i) of the first embodiment, the forward channel estimate is determined directly from the weight vector as shown in the following equation:

$$\hat{c}_f(n) = w(n).$$

The first embodiment of the channel autocorrelation tracking technique utilizes the reverse channel as a component of the estimate of the forward channel autocorrelation because the autocorrelation of the reverse channel vector may be similar to the autocorrelation matrix of the forward channel vector. This relationship is shown in the following Equation 2:

$$R_f \approx R_r \quad \text{Equation (2)}$$

When Equation 2 is not valid, the reverse channel should not be used as an approximation for the forward channel.

Thus, $a_r$, which weights the reverse channel component of the overall estimation as will be described below, should be set equal to zero as described further below.

In accordance with STEPS (a)(i) and (a)(ii) of the first embodiment, the forward and reverse channel autocorrelation matrix estimates are given by the following Equations (3) and (4), respectively:

$$\hat{R}_f(n) = \sum_{k=0}^{\infty} h_f(k)\hat{c}_f(n-k)\hat{c}_f^H(n-k). \quad \text{Equation (3)}$$

$$\hat{R}_r(n) = \sum_{k=0}^{\infty} h_r(k)\hat{c}_r(n-k)\hat{c}_r^H(n-k). \quad \text{Equation (4)}$$

where $h_r(\ )$ and $h_f(\ )$ are causal estimation filters with unit DC gain so that $$\sum_{k=0}^{\infty} h_r(k) = \sum_{k=0}^{\infty} h_f(k) = 1.$$

One simple filter adapted for use with the present invention is an exponential filter that can be represented by the following equation:

$$h(k) = \begin{cases} 0 & k < 0 \\ (1-\lambda)\lambda^k & k \geq 0 \end{cases}$$

Thus, yielding a simple recursive update that is represented by the following equation:

$$\hat{R}(n) = (1-\lambda)c(n)c^H(n) + \lambda\hat{R}(n-1).$$

In accordance with STEP (b) of the first embodiment, the autocorrelation matrix of the applied perturbation vector is given by the following equation:

$$R_v = 2\left(a_f \frac{\hat{R}_f}{\|\hat{R}_f\|} + a_r \frac{\hat{R}_r}{\|\hat{R}_r\|} + (1 - a_f - a_r)I\right);$$

where $a_f$ and $a_r$ are algorithm parameters, wherein $0 \leq a_f \leq 1$, $0 \leq a_r \leq 1$, and $0 \leq (a_f + a_r) \leq 1$.

The algorithm parameters, $a_f$ and $a_r$, can be determined in any convenient manner such as an empirical method (e.g., based on field measurement and calibration of antenna units). In the first embodiment, the approximation referenced in Equation 2 can be utilized when the basestation uses the same antennas for Tx and Rx. Also, depending on the geometry and radio carrier frequencies used, the reverse channel may or may not be useful in generating the perturbation autocorrelation matrix. If the reverse channel is not useful then $a_r$ is set to equal zero.

In accordance with the first embodiment, the time constants of the autocorrelation matrix estimations would be much larger than the time constant of the tracking given by β. In one exemplary embodiment, the autocorrelation matrix estimations are many times longer in duration (e.g., 100 to 100,000 times longer).

The STEP (c) of the first embodiment can be performed by any TxAA algorithm. An exemplary TxAA algorithm that can be utilized with the first embodiment of the present invention is described above with reference to the TxAA weighting embodiment.

The first embodiment of the channel autocorrelation tracking technique is a linear approach that utilizes the forward and reverse channels to estimate the autocorrelation matrix and apply the estimate to Equation 1. One skilled in the communication art shall recognize that other approaches such as non-linear approaches can be utilized with the present invention without departing from the scope or spirit of the present invention. One such non-linear approach is now described with reference to the second embodiment of the channel autocorrelation tracking technique.

Channel Autocorrelation Tracking Technique—A Second Embodiment

The second embodiment of the channel autocorrelation tracking technique of the present invention extracts a coarse gradient estimate in a similar manner to the first embodiment. Specifically, the second embodiment utilizes eigendecompositions to generate non-linear functions of the autocorrelation matrix. These non-linear functions can provide improved tracking by "expanding" and "compressing" the tracking rate within the different subspaces of the autocorrelation matrix estimate. Expanding the tracking rate is defined as emphasizing stronger eigenmodes and de-emphasizes weaker eigenmodes. Compressing the tracking rate is defined as bringing the tracking rates of strong and weak eigenmodes closer.

As described further below, a parameter p, applied as a matrix exponent, determines the degree of expansion or compression of the tracking rate. In the limit when p=0, the autocorrelation matrix is not used to assist tracking and all subspaces are tracked at the same rate. In the limit when p→∞, only the dominant subspace is tracked and the others are ignored. When p=1 the second embodiment operates in a similar manner to the first embodiment. The operation of the second embodiment of the channel autocorrelation tracking technique is summarized in the following steps:

(a) determine a perturbation vector autocorrelation matrix estimate ($R_f$, $R_r$) based on non-linear channel subspace weighting matrices (e.g., $\hat{R}_f^P$, $\hat{R}_r^P$ and $\hat{R}_{f,r}^P$) utilizing eigendecompositions;

(b) determine a perturbation vector autocorrelation ($R_v$) based on the forward and reverse channel subspace weighting matrix; and (c) determine a weight vector (w) based on the perturbation vector autocorrelation by a TxAA algorithm.

The second embodiment of the channel autocorrelation tracking technique is a non-linear approach that can improve performance as the technique expands or compresses the tracking rate versus noise tradeoff for the various eigenmodes of the autocorrelation matrix. The second embodiment utilizes a tracking rate ratio, γ, to expand or compress the tracking rates. The tracking rate ratio is defined as the ratio of one eigenmode to another eigenmode. Two exemplary methods of the second embodiment of the channel autocorrelation tracking technique are described hereinbelow.

In accordance with STEPS (a)(i) and (a)(ii) of the second embodiment of the channel autocorrelation tracking technique, Equations (3) and (4) described above with regard to the first embodiment undergo eigendecompositions. These eigendecompositions can be represented by the following equations:

$$\hat{R}_f = Q_f \Lambda_f Q_f^H;$$

$$\hat{R}_r = Q_r \Lambda_r Q_r^H;$$

where the matrices Q are comprised of the eigenvectors of the corresponding matrices R; and the matrices Λ are diagonal, containing the eigenvalues of R.

These eigendecompositions can be performed by any standard method. One such method is described in a book by G. H. Golub and C. F. van Loan, entitled "*Matrix Computations*, Third Edition", published by Johns Hopkins University Press in 1996, which is hereby incorporated by reference for its teachings on eigendecompositions and matrix algebra.

In accordance with STEP (a) of the first exemplary method of the second embodiment, these eigendecompositions are used to generate non-linear functions of the autocorrelation matrix that can be represented by the following equations:

$$\hat{R}_f^p = Q_f \Lambda_f^p Q_f^H$$

$$\hat{R}_r^p = Q_r \Lambda_r^p Q_r^H$$

When p is an integer the power operation can be performed without the eigendecomposition, however, performing the eigendecomposition is effective for generating the correlated perturbation vector because the method can simply use the eigendecomposition as the orthogonal basis of the random vector generation. The selection of algorithm for performing the eigendecomposition is dependent on the value of p and the number of dimensions to the matrices.

In accordance with STEP (b) of the first exemplary method of the second embodiment, the autocorrelation matrix of the generated perturbation vector can be represented by the following Equation 5:

$$R_v = 2\left( a_f \frac{\hat{R}_f^p}{\|\hat{R}_f^p\|} + a_r \frac{\hat{R}_r^p}{\|\hat{R}_r^p\|} + (1 - a_f - a_r)I \right); \quad \text{Equation (5)}$$

where $a_f$ and $a_r$ are algorithm parameters, wherein $0 \leq a_f$, $a_r \leq 1$ and $0 \leq (a_f + a_r) \leq 1$.

The STEP (c) of the second embodiment can be performed by any TxAA algorithm. An exemplary TxAA algorithm that can be utilized with the second embodiment of the present invention is described above with reference to the TxAA weighting embodiment. An exemplary second embodiment of the channel autocorrelation tracking technique has been described. One skilled in the communication art shall recognize that alternative methods of performing the second embodiment can be utilized with the present invention without departing from the scope or spirit of the present invention. A second exemplary method of the second embodiment is now described.

The second exemplary method of the second embodiment of the present invention performs the operation STEPS (a) and (b) in accordance with the following description. STEP (c) is performed in a similar manner to the first exemplary method of the second embodiment.

In STEP (a) of the second exemplary method of the second embodiment, the method utilizes a joint exponentiation of forward and reverse estimate components, according to the following equation:

$$\hat{R}_{f,r}^p = \left( a_f \frac{\hat{R}_f}{\|\hat{R}_f\|} + a_r \frac{\hat{R}_r}{\|\hat{R}_r\|} \right)^p = Q_{f,r} \Lambda_{f,r}^p Q_{f,r}^H.$$

In STEP (b) of the second exemplary method of the second embodiment, the method utilizes the following Equation 6:

$$R_v = 2\left( (a_f + a_r) \frac{\hat{R}_{f,r}^p}{\|\hat{R}_{f,r}^p\|} + (1 - a_r - a_f)I \right) \quad \text{Equation (6)}$$

The present invention can use either exemplary methods of the second embodiment to improve transmit antenna weight tracking in a communication system. The present invention may use the second exemplary method instead of the first exemplary method based on computational complexity. For example, Equation 6 has less computational complexity than Equation 5.

The third exemplary method of the second embodiment of the present invention performs the operation STEP (b) in accordance with the following description. STEPS (a) and (c) are performed in a similar manner to the first exemplary method of the second embodiment.

In STEP (b) of the third exemplary method of the second embodiment, the method utilizes the following equation:

$$R_v = 2\left( a_f \frac{\hat{R}_f}{\|\hat{R}_f\|} + a_r \frac{\hat{R}_r}{\|\hat{R}_r\|} + (1 - a_r - a_f)I \right)^p$$

The third exemplary method is advantageously less complex than the first exemplary method. To wit, only one eigendecomposition must be calculated versus two. A further advantage is the inclusion of the identity matrix prior to the eigendecomposition, which ensures a numerically robust decomposition. Such good conditioning for robust decomposition may not be available from the raw values of R without the additional diagonal weighting, because the matrices R may not be well conditioned. An exemplary implementation of the channel autocorrelation tracking technique is now described.

An Exemplary Implementation of the Channel Autocorrelation Tracking Technique

The exemplary implementation of the channel autocorrelation tracking technique identifies exemplary values for parameters such as β and p. These parameters can be determined from simulations and field data. In simulations of bit error rate for tracking of uncorrelated fading with systems having L=3 transmit antennas, the exemplary implementation sets β equal to a value of 0.1. The exemplary implementation sets p equal to a value of 2 because it is desirable to leave the "all-mode" excitation at 1/10 of the normal excitation as this induces very small excess weight noise, and thus it is advantageous to set p greater than 1 to take advantage of highly correlated environments. Thus, the exemplary implementation comprises the following algorithm parameters for L=3 antennas:

β=0.1 p=2

$a_f + a_r = 0.90$ $$h_f(k) = h_r(k) = \begin{cases} 0 & k < 0 \\ (0.0001) \cdot 0.9999^k & k \geq 0 \end{cases}$$

The exemplary implementation utilizes the non-linear implementation of the second embodiment of the channel autocorrelation tracking technique (i.e., Equation 6). If Equation 2 is valid (i.e., the reverse channel autocorrelation is useful in determining the forward channel autocorrelation), then $a_f = a_r = 0.45$, otherwise $a_r = 0$ and $a_f = 0.9$. In general, Equation 2 will be invalid when the antennas are spaced far apart or the duplex frequency is large.

To facilitate a better understanding of the usefulness of the reverse channel autocorrelation in determining the estimation, an example is now described. A system having an algorithm measurement feedback period of 0.625 ms requires 10,000 sample subspace weighting matrices with $a_r = 0$, and thus requires a autocorrelation estimation filter time constant of 6.25 seconds. If the reverse channel can be used to help determine the estimation, then 10,000 samples (half from the forward channel and half from reverse channel) requires a autocorrelation filter time constant of 3.125 seconds on each of the forward and reverse estimators. Thus, the reverse channel autocorrelation is advantageously utilized to determine the estimation.

Figure 11:
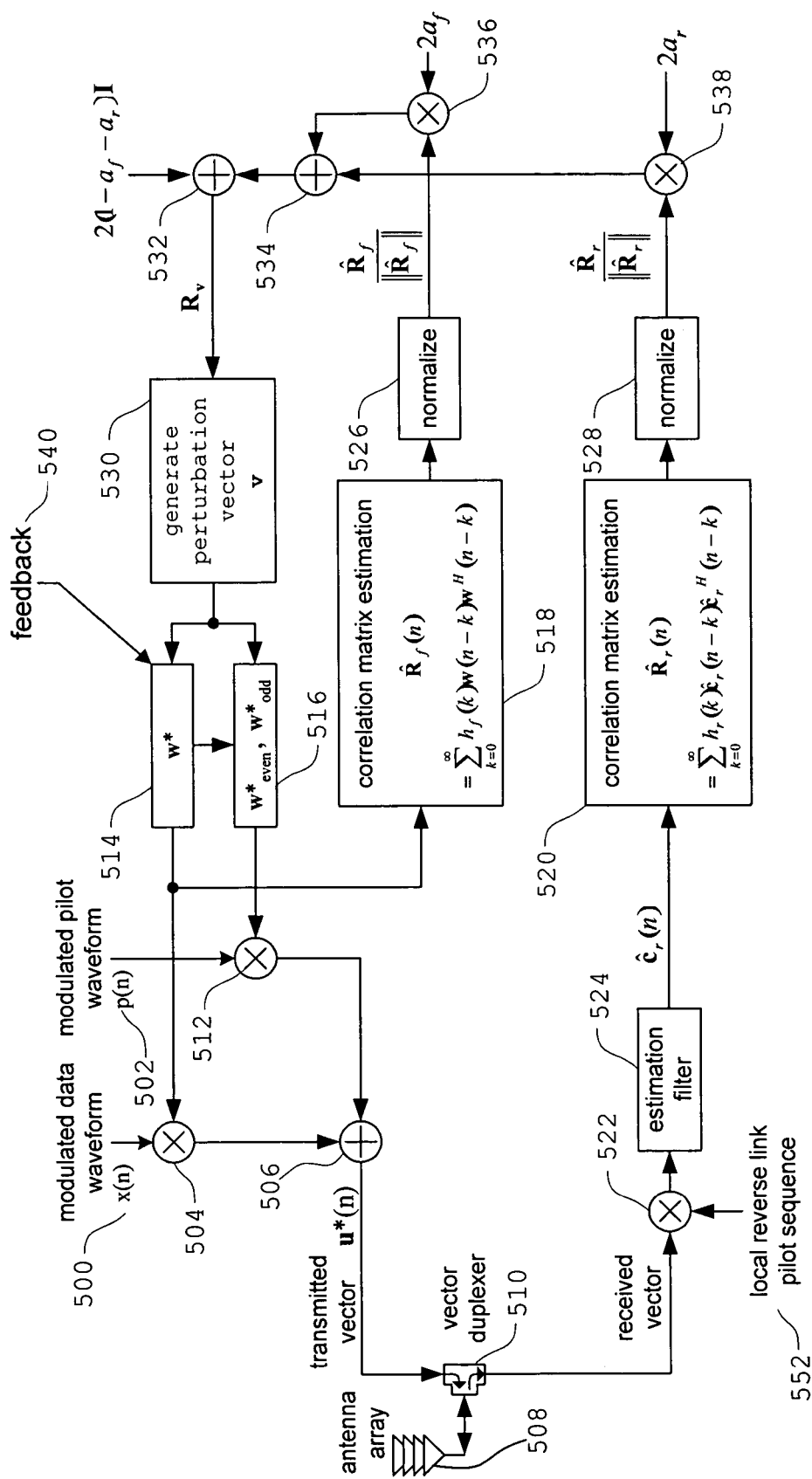
FIG. 11 is a block diagram of an exemplary device that is adapted for use with the present invention.

FIG. 11 is a block diagram of an exemplary apparatus adapted for use with the first embodiment of the channel autocorrelation tracking technique. FIG. 11 is a baseband equivalent model of the first embodiment. The exemplary apparatus generates perturbation vectors without subspace emphasis through matrix exponentiation by the exponent p. The following description regarding FIG. 11 describes the operation for a single transmission x(n), however, the present invention is not limited to a single transmission. Those skilled in the art shall recognize that the present technique can operate in a parallel manner using multiple transmissions to multiple receivers without departing from the scope or spirit of the present invention.

As shown in FIG. 11, the exemplary transmitter unit apparatus comprises an antenna array 508, a vector duplexer 510, an estimation filter 524, a reverse link subspace weighting matrix generator 520, a forward link subspace weighting matrix generator 518, a perturbation vector generator 530, multipliers 504, 512, 522, 536, 538, normalizers 526, 528 and adders 506, 534, 532. The antenna array 508 comprises multiple antennas, where each antenna is used for both transmission and reception. The vector duplexer 510 represents a single duplexer for each antenna of the antenna array 508 so that transmission and reception vectors are isolated. The antenna array 508 inputs a received vector to the vector duplexer 510. The vector duplexer 510 inputs the received vector to the multiplier 522.

The multiplier 522 multiplies the received vector by a scalar reverse link pilot sequence 552. The multiplier 522 inputs a resultant vector to the estimation filter 524. The estimation filter 524 generates a received channel vector estimate $\hat{c}_r(n)$ and inputs the received channel vector estimate $\hat{c}_r(n)$ to the reverse link subspace weighting matrix generator 520. The reverse link subspace weighting matrix generator 520 generates a reverse subspace weighting matrix.

A forward weight vector 514 inputs to the multiplier 504 and is multiplied by a scalar traffic sequence 500 to produce a forward resultant vector. The forward link subspace weighting matrix generator 518 inputs the forward weight vector 514 to generate a forward subspace weighting matrix. The reverse subspace weighting matrix is normalized and scaled by the normalizer 528 and multiplier 538, respectively. The forward subspace weighting matrix is normalized and scaled by the normalizer 526 and multiplier 536, respectively. The outputs of the multipliers 538, 536 are added to a scaled identity matrix through adders 534 and 532. The adder 532 inputs a resultant matrix $R_v$ to the perturbation vector generator 530 whereat the resultant matrix $R_v$ is used as an autocorrelation matrix of a generated vector v. This generated vector v is used to generate even/odd weight vectors 516 which are applied through multiplier 512 to the forward pilot sequence 502. The generated vector v is also used in updating the traffic weight vector w 514 with feedback 540 from the receiver.

Summary

The present channel autocorrelation tracking technique improves weight vector tracking in a wireless communication system by taking advantage of the observation that tracking can be improved when the channel vector representing the gain from multiple transmit antennas to a single receive antenna is comprised of correlated elements. In a first embodiment of the autocorrelation tracking technique, the present invention extracts a coarse gradient estimate by utilizing a correlated perturbation vector, where the perturbation vector autocorrelation is determined from an estimate of the forward channel vector autocorrelation, and the extracted gradient is used to update the transmission weight vector.

In a second embodiment of the channel autocorrelation tracking technique, the present invention adjusts the tracking rate of the weight vector in the different subspaces of the channel estimate autocorrelation matrix by emphasizing or de-emphasizing the differences of the eigenmodes of the channel vector autocorrelation. Specifically, the autocorrelation applied to the perturbation vectors is an exponentiated version of the estimate of the channel autocorrelation. In one embodiment this exponentiation is performed using eigendecompositions. These non-linear functions can provide improved tracking by "expanding" and "compressing" the tracking rate of the different subspaces of the channel subspace weighting matrix.

A number of embodiments of the present invention have been described. Nevertheless, it will be understood that various modifications may be made without departing from the spirit and scope of the invention. For example, the weight vector update can be performed by the TxAA algorithm or another feedback algorithm that comprises one-bit feedback.

Accordingly, it is to be understood that the invention is not to be limited by the specific illustrated embodiment, but only by the scope of the appended claims.

What is claimed is:

1. A method of transmit antenna weight tracking in a communication system, wherein the communication system includes a transmitter and a receiver, wherein the transmitter includes a plurality of antennae, and wherein the communication system is capable of communicating utilizing a transmit adaptive antenna weighting technique, the method comprising:
a) determining a channel autocorrelation matrix estimate of a forward channel gain vector, including calculating a reverse channel autocorrelation matrix estimate; and
b) determining a transmitter antenna weight vector based on feedback from the receiver and the channel autocorrelation matrix estimate determined in the act (a), including subacts of
  i) determining a perturbation vector autocorrelation matrix based on the channel autocorrelation matrix estimate determined in the act (a), including calculating the perturbation vector autocorrelation matrix $R_v$ from a forward channel autocorrelation matrix $R_f$ estimate and a reverse channel autocorrelation matrix $R_r$ estimate according to the following equation:

$$R_v = 2\left(a_f \frac{\hat{R}_f}{\|\hat{R}_f\|} + a_r \frac{\hat{R}_r}{\|\hat{R}_r\|} + (1 - a_f - a_r)I\right);$$

where $a_f$ and $a_r$ are algorithm parameters, wherein $0 \leq a_f \leq 1$, $0 \leq a_r \leq 1$, and $0 \leq (a_f + a_r) \leq 1$;
  ii) generating a perturbation vector having an autocorrelation given by the autocorrelation matrix determined in act (i);
  iii) utilizing the perturbation vector from act (ii) in a waveform transmitted from the transmitter; and
  iv) utilizing a measurement of the waveform transmitted from the transmitter from act (iii) at the receiver to generate feedback.

2. A method of transmit antenna weight tracking in a communication system, wherein the communication system includes a transmitter and a receiver, wherein the transmitter includes a plurality of antennae, and wherein the communication system is capable of communicating utilizing a transmit adaptive antenna weighting technique, the method comprising:
a) determining a channel autocorrelation matrix estimate of a forward channel gain vector, including calculating a reverse channel autocorrelation matrix estimate with the following sub-acts:
  i) calculating a coherent channel vector estimate by multiplying a receiver waveform with a local version of a reverse channel pilot sequence conjugated and filtering the resultant with a filter to give the reverse channel vector estimate $\hat{c}_r$;
  ii) calculating an outer product $\hat{c}_r\hat{c}_r^H$; and
  iii) filtering the outer product $\hat{c}_r\hat{c}_r^H$ to produce the reverse channel autocorrelation matrix estimate; and
b) determining a transmitter antenna weight vector based on feedback from the receiver and the channel autocorrelation matrix estimate determined in the act (a).

3. A method of transmit antenna weight tracking in a communication system, wherein the communication system includes a transmitter and a receiver, wherein the transmitter includes a plurality of antennae, and wherein the communication system is capable of communicating utilizing a transmit adaptive antenna weighting technique, the method comprising:
a) determining a channel autocorrelation matrix estimate of a forward channel gain vector, including an act of calculating an initial forward autocorrelation matrix estimate with the following sub-acts
  i) calculating a coherent channel vector estimate directly from a transmit weight vector to give a reverse channel vector estimate $\hat{c}_f$;
  ii) calculating an outer product $\hat{c}_f\hat{c}_f^H$; and
  iii) filtering the outer product $\hat{c}_f\hat{c}_f^H$ to produce the forward channel autocorrelation matrix estimate; and
b) determining a transmitter antenna weight vector based on feedback from the receiver and the channel autocorrelation matrix estimate determined in the act (a).

4. A method of transmit antenna weight tracking in a communication system, wherein the communication system includes a transmitter and a receiver, wherein the transmitter includes a plurality of antennae, and wherein the communication system is capable of communicating utilizing a transmit adaptive antenna weighting technique, the method comprising:
a) determining a channel autocorrelation matrix estimate of a forward channel gain vector, including
  i) calculating a reverse channel autocorrelation matrix estimate, and
  ii) determining a forward channel autocorrelation matrix $R_f$ estimate and a reverse channel autocorrelation matrix estimate $R_r$ according to the following equations:

$$\hat{R}_f(n) = \sum_{k=0}^{\infty} h_f(k)\hat{c}_f(n-k)\hat{c}_f^H(n-k); \text{ and}$$

$$\hat{R}_r(n) = \sum_{k=0}^{\infty} h_r(k)\hat{c}_r(n-k)\hat{c}_r^H(n-k); \text{ and}$$

b) determining a transmitter antenna weight vector based on feedback from the receiver and the channel autocorrelation matrix estimate determined in the act (a).

5. The method of transmit antenna weight tracking as defined in claim 4, wherein $h_r(\ )$ and $h_f(\ )$ are causal estimation filters with unit DC gain according to the following equation:

$$\sum_{k=0}^{\infty} h_r(k) = \sum_{k=0}^{\infty} h_f(k) = 1.$$

6. The method of transmit antenna weight tracking as defined in claim 5, wherein the causal estimation filters are exponential filters that can be represented by the following equation:

$$h(k) = \begin{cases} 0 & k < 0 \\ (1-\lambda)\lambda^k & k \geq 0. \end{cases}$$

7. A method of transmit antenna weight tracking in a communication system, wherein the communication system includes a transmitter and a receiver, wherein the transmitter includes a plurality of antennae, and wherein the communication system is capable of communicating utilizing a transmit adaptive antenna weighting technique, the method comprising:
a) selecting different first and second perturbation vectors, wherein a perturbation vector is a vector that temporarily modifies a previously determined transmitter antennae weight vector to create a test weight vector;

b) determining a new transmitter antennae weight vector based at least in part on feedback from the receiver that reflects a comparison between receptions of different signal sets, including i) a first signal set transmitted during one or more first time periods that is a source signal as weighted by a first test weight vector based on an old transmitter antennae weight vector as perturbed according to the first perturbation vector, and ii) a second signal set transmitted during one or more second time periods that is substantially the same source signal as weighted by a second test weight vector based on the old transmitter antennae weight vector as perturbed according to a different second perturbation vector;

c) determining a channel autocorrelation matrix estimate of a forward channel gain vector; and d) determining a transmitter antenna weight vector based on feedback from the receiver and the channel autocorrelation matrix estimate determined in the act (c), wherein the act (d) comprises the following sub-acts:

i) determining a perturbation vector autocorrelation matrix based on the channel autocorrelation matrix estimate determined in the act (c), wherein the sub-act (d)(i) of determining a perturbation vector autocorrelation matrix comprises the following sub-acts:

(1) calculating a forward channel autocorrelation matrix estimate;

(2) calculating a reverse channel autocorrelation matrix estimate; and (3) generating the perturbation vector autocorrelation matrix from the estimates calculated in the sub-acts (1) and (2);

ii) generating a perturbation vector having an autocorrelation given by the autocorrelation matrix determined in the act (d)(i);

iii) utilizing the perturbation vector from the act (d)(ii) in a waveform transmitted from the transmitter; and iv) utilizing a measurement of the waveform transmitted from the transmitter from the act (d)(iii) at the receiver to generate feedback; and wherein the generating the perturbation vector autocorrelation matrix sub-act (3) generates the perturbation vector autocorrelation matrix $R_v$ from estimates of forward and reverse autocorrelation matrices $R_f$ and $R_r$ by the following equation:

$$R_v = 2\left(a_f \frac{\hat{R}_f^p}{\|\hat{R}_f^p\|} + a_f \frac{\hat{R}_r^p}{\|\hat{R}_r^p\|} + (1 - a_f - a_r)I\right);$$

where $a_f$ and $a_r$ are algorithm parameters, wherein $0 \leq a_f \leq 1$, $0 \leq a_r \leq 1$ and $0 \leq (a_f + a_r) \leq 1$.

8. The method of transmit antenna weight tracking as defined in claim 7, wherein the communication system comprises a DS-CDMA communication system.

9. The method of transmit antenna weight tracking as defined in claim 7, wherein the determining a channel autocorrelation matrix estimate act (c) further comprises normalizing the channel autocorrelation matrix estimate.

10. The method of transmit antenna weight tracking as defined in claim 7, wherein the determining a channel autocorrelation matrix estimate act (c) comprises calculating an initial forward channel autocorrelation matrix estimate.

11. The method of transmit antenna weight tracking as defined in claim 10, wherein the calculating the initial forward channel autocorrelation matrix estimate comprises determining the forward channel autocorrelation matrix estimate directly from a weight vector.

12. The method of claim 7, wherein the determining a channel autocorrelation matrix estimate act (c) comprises calculating a reverse channel autocorrelation matrix estimate.

13. The method of transmit antenna weight tracking as defined in claim 7, wherein exponentiations of autocorrelation matrices are adjusted to expand or compress a tracking rate.

14. The method of transmit antenna weight tracking as defined in claim 7, wherein the method utilizes eigendecompositions to generate the perturbation vector autocorrelation matrix.

15. The method of transmit antenna weight tracking as defined in claim 14, wherein the forward channel autocorrelation matrix $R_f$ estimate and the reverse channel autocorrelation matrix $\hat{R}_r$ estimate are represented by the following equations:

$$\hat{R}_f = Q_f \Lambda_f Q_f^H; \text{ and}$$

$$\hat{R}_r = Q_r \Lambda_r Q_r^H;$$

where the matrices Q are comprised of eigenvectors of corresponding matrices R; and matrices $\Lambda$ are diagonal, containing eigenvalues of R.

16. The method of transmit antenna weight tracking as defined in claim 15, wherein the forward channel autocorrelation matrix estimate and the reverse channel autocorrelation matrix estimate are modified by exponentiation represented by the following equations:

$$\hat{R}_f^p = Q_f \Lambda_f^p Q_f^H; \text{ and}$$

$$\hat{R}_r^p = Q_r \Lambda_r^p Q_r^H.$$

17. The method of transmit antenna weight tracking as defined in claim 7, wherein the forward channel autocorrelation matrix $R_f$ estimate and the reverse channel autocorrelation matrix $R_r$ estimate jointly generate a modified matrix represented by the following equation:

$$\hat{R}_{f,r}^p = \left(a_f \frac{\hat{R}_f}{\|\hat{R}_f\|} + a_r \frac{\hat{R}_r}{\|\hat{R}_r\|}\right)^p = Q_{f,r} \Lambda_{f,r}^p Q_{f,r}^H.$$

18. The method of transmit antenna weight tracking as defined in claim 7, wherein the generating the perturbation vector autocorrelation matrix sub-act (3) generates the perturbation vector autocorrelation matrix $R_v$ from estimates of the forward autocorrelation matrix $R_f$ and the reverse autocorrelation matrix $R_r$ by the following equation:

$$R_v = 2\left(a_f \frac{\hat{R}_f}{\|\hat{R}_f\|} + a_r \frac{\hat{R}_r}{\|\hat{R}_r\|} + (1 - a_r - a_f)I\right)^p.$$

19. The method of transmit antenna weight tracking as defined in claim 18, wherein the method utilizes eigendecompositions to generate the perturbation vector autocorrelation matrix.

20. The method of transmit antenna weight tracking as defined in claim 19, wherein the forward channel autocorrelation matrix estimate and the reverse channel autocorrelation matrix estimate are represented by the following equations:

$$\hat{R}_f = Q_f \Lambda_f Q_f^H; \text{ and}$$

$$\hat{R}_r = Q_r \Lambda_r Q_r^H;$$

where the matrices Q are comprised of eigenvectors of corresponding matrices R; and
matrices $\Lambda$ are diagonal, containing eigenvalues of R.

21. The method of transmit antenna weight tracking as defined in claim 20, wherein the forward channel autocorrelation matrix estimate and the reverse channel autocorrelation matrix estimate are modified by exponentiation represented by the following equations:

$$\hat{R}_f^p = Q_f \Lambda_f^p Q_f^H; \text{ and}$$

$$\hat{R}_r^p = Q_r \Lambda_r^p Q_f^H.$$

22. The method of transmit antenna weight tracking as defined in claim 7, wherein the channel autocorrelation matrix estimate of a forward channel gain vector is based on a receiver position/environment data.

23. The method of transmit antenna weight tracking as defined in claim 22, wherein the receiver position/environment data comprises angle of arrival.

24. The method of transmit antenna weight tracking as defined in claim 22, wherein the receiver position/environment data comprises angular spread of a channel.

25. The method of transmit antenna weight tracking as defined in claim 22, wherein the receiver position/environment data comprises geographical position of a mobile station.

26. The method of transmit antenna weight tracking as defined in claim 25, wherein an angle of arrival is based on the geographical position of a mobile station.

27. The method of transmit antenna weight tracking as defined in claim 25, wherein the geographical position of a mobile station is based on Global Positioning System (GPS) data.

28. A communication system, capable of performing a transmit adaptive antenna weighting technique in accordance with the method of claim 7, comprising:
   a) a transmitter capable of:
      i) determining a channel autocorrelation matrix estimate of a forward channel gain vector;
      ii) determining a perturbation vector autocorrelation matrix based on the channel autocorrelation matrix estimate;
      iii) generating a perturbation vector having an autocorrelation associated with the perturbation vector autocorrelation matrix; and
      iv) determining a weight vector that is based on the perturbation vector and a TxAA algorithm that incorporates a feedback from a receiver; and
   b) a receiver, capable of:
      i) receiving a signal based on the perturbation vector; and
      ii) generating feedback based on the signal.

29. The apparatus as defined in claim 28, wherein a plurality of transmitters transmit to the receiver when the receiver is in soft handoff.

30. The apparatus as defined in claim 29, wherein the plurality of transmitters transmit information regarding multiple antenna transmission to each other via a backhaul.

31. The apparatus as defined in claim 30, wherein the plurality of transmitters transmit information regarding positioning to each other via a backhaul.

32. Apparatus that performs transmit antenna weight tracking in a communication system that includes a transmitter and a receiver, wherein the transmitter includes a plurality of antennae, and the communication system is capable of employing a transmit adaptive antenna weighting technique, comprising:
   a) means for selecting different first and second perturbation vectors wherein a perturbation vector is a vector that temporarily modifies a previously determined transmitter antennae weight vector to create a test weight vector;
   b) means for determining a new transmitter antennae weight vector based at least in part on feedback from the receiver that reflects a comparison between reception of different signal sets, including
      i) a first signal set transmitted during one or more first time periods that is a source signal as weighted by a first test weight vector based on an old transmitter antennae weight vector as perturbed according to the first perturbation vector,
      ii) a second signal set transmitted during one or more second time periods that is substantially the same source signal as weighted by a second test weight vector based on the old transmitter antennae weight vector as perturbed according to a different second perturbation vector;
   c) means for determining a channel autocorrelation matrix estimate of a forward channel gain vector, wherein the means for determining a channel autocorrelation matrix estimate of a forward channel gain vector further comprises means for calculating a reverse channel autocorrelation matrix estimate; and
   d) means, responsive to the means (c), for determining a transmitter antenna weight vector based on feedback from the receiver and the channel autocorrelation matrix estimate determined by the means (c); further including means for determining a perturbation vector autocorrelation matrix $R_v$ from a forward channel autocorrelation matrix $R_f$ and a reverse channel autocorrelation matrix $R_r$ according to the following equation:

$$R_v = 2\left(a_f \frac{\hat{R}_f}{\|\hat{R}_f\|} + a_r \frac{\hat{R}_r}{\|\hat{R}_r\|} + (1 - a_f - a_r)I\right);$$

where $a_f$ and $a_r$ are algorithm parameters, wherein $0 \leq a_f \leq 1$, $0 \leq a_r \leq 1$, and $0 \leq (a_f + a_r) \leq 1$.

33. The apparatus as defined in claim 32, wherein the determining a transmitter antenna weight vector means (d) further comprises:
  i) means for determining a perturbation vector autocorrelation matrix based on the means (c);
  ii) means, responsive to the means (d)(i), for generating a perturbation vector having an autocorrelation given by the means (d)(i);
  iii) means, responsive to the means (d)(ii), for utilizing the perturbation vector from the means (ii) in a waveform transmitted from the transmitter; and
  iv) means, responsive to the means (d)(iii), for utilizing a measurement at the receiver of the waveform transmitted from the transmitter to generate feedback.

34. The apparatus as defined in claim 32, wherein the determining a perturbation vector autocorrelation matrix means comprises:
  (1) means for calculating a forward channel autocorrelation matrix estimate;
  (2) means for calculating a reverse channel autocorrelation matrix estimate; and
  (3) means, responsive to the forward channel autocorrelation matrix estimate means and the reverse channel autocorrelation matrix estimate means, for utilizing eigendecompositions to generate the perturbation vector autocorrelation based on estimates from the forward channel autocorrelation matrix estimate means and the reverse channel autocorrelation matrix estimate means.

35. The apparatus as defined in claim 32, wherein the determining a perturbation vector autocorrelation matrix means comprises:
  i) means for calculating a forward channel perturbation vector autocorrelation matrix utilizing eigendecompositions; and
  ii) means for calculating a reverse channel perturbation vector autocorrelation matrix utilizing eigendecompositions.

36. A transmitter configured to weight signals according to weighting vectors adaptively adjusted for transmission to a target receiver via a plurality of antennae, comprising:
  A) means for selecting different first and second perturbation vectors, wherein a perturbation vector is a vector that temporarily modifies a previously determined transmitter antennae weight vector to create a test weight vector; and
  B) means for transmitting different test signal sets, including
    i) a first test signal set transmitted during one or more first time periods that is a source signal as weighted by a first test weight vector, wherein the first test weight vector is based on an old transmitter antennae weight vector as perturbed according to the first perturbation vector, and
    ii) a second test signal set transmitted during one or more second time periods that is substantially the same source signal as weighted by a second test weight vector based on the old transmitter antennae weight vector as perturbed according to the different second perturbation vector; and
  C) means for determining a new transmitter antennae weight vector based at least in part on feedback from the target receiver that is treated as reflecting a comparison between reception of the first and second test signal sets; further comprising:
    a) a channel autocorrelation matrix estimator, capable of estimating a channel autocorrelation matrix of a forward channel gain vector; wherein the channel autocorrelation matrix estimator further includes a reverse channel autocorrelation matrix estimator capable of calculating a reverse channel autocorrelation matrix estimate;
    b) a perturbation vector autocorrelation matrix calculator, responsive to the channel autocorrelation matrix estimator, capable of determining a perturbation vector autocorrelation matrix based on the channel autocorrelation matrix estimate;
    c) a perturbation vector generator, responsive to the perturbation vector autocorrelation matrix calculator, capable of generating a perturbation vector having an autocorrelation associated with the perturbation vector autocorrelation matrix; and d) a weight vector calculator, responsive to the perturbation vector generator, capable of determining a weight vector that is based on the perturbation vector and a TxAA algorithm that incorporates a feedback from the receiver wherein the reverse channel autocorrelation matrix estimator comprises:
      i) a coherent channel vector estimator, capable of calculating a coherent channel vector estimate $\hat{c}$ by multiplying a receiver waveform with a local version of a reverse channel pilot sequence conjugated and filtering the resultant with a filter;
      ii) an outer product calculator, responsive to the coherent channel vector estimator, capable of calculating an outer product $\hat{c}\hat{c}^H$; and
      iii) a filter, responsive to the outer product calculator, capable of filtering the outer product $\hat{c}\hat{c}^H$ to produce the reverse channel autocorrelation matrix estimate.

37. The transmitter as defined in claim 36, wherein the channel autocorrelation matrix estimator comprises a forward channel autocorrelation estimator, capable of calculating a forward channel autocorrelation matrix estimate.

38. The transmitter as defined in claim 36, wherein the channel autocorrelation matrix estimator comprises:
  i) a forward channel autocorrelation matrix estimator, capable of calculating a forward channel autocorrelation matrix estimate utilizing eigendecompositions; and
  ii) a reverse channel autocorrelation matrix estimator, capable of calculating a reverse channel autocorrelation matrix estimate utilizing eigendecompositions.

* * * * *